(12) United States Patent
Komada et al.

(10) Patent No.: US 10,583,890 B2
(45) Date of Patent: Mar. 10, 2020

(54) BAR-END DEVICE ASSEMBLY FOR TUBE MEMBER OF BICYCLE

(71) Applicant: Shimano Inc., Sakai, Osaka (JP)

(72) Inventors: Yasuyuki Komada, Osaka (JP); Kohei Ohyabu, Osaka (JP)

(73) Assignee: Shimano Inc., Osaka (JP)

( * ) Notice: Subject to any disclaimer, the term of this patent is extended or adjusted under 35 U.S.C. 154(b) by 189 days.

(21) Appl. No.: 15/438,642

(22) Filed: Feb. 21, 2017

(65) Prior Publication Data

US 2018/0238354 A1 Aug. 23, 2018

(51) Int. Cl.
| | |
|---|---|
| *B62K 21/12* | (2006.01) |
| *B62K 23/02* | (2006.01) |
| *B62L 3/02* | (2006.01) |
| *B62K 23/06* | (2006.01) |
| *B62M 25/08* | (2006.01) |
| *B62M 25/04* | (2006.01) |

(52) U.S. Cl.
CPC .............. *B62L 3/023* (2013.01); *B62K 21/12* (2013.01); *B62K 23/02* (2013.01); *B62K 23/06* (2013.01); *B62M 25/04* (2013.01); *B62M 25/08* (2013.01)

(58) Field of Classification Search
CPC ........ B62K 21/12; B62K 23/02; B62K 23/06; B62M 25/04; B62M 25/08; B62L 3/02; B62L 3/023
See application file for complete search history.

(56) References Cited

U.S. PATENT DOCUMENTS

| | | | | |
|---|---|---|---|---|
| 4,462,267 | A | * | 7/1984 | Shimano ............... B62K 21/12 74/489 |
| 4,771,649 | A | * | 9/1988 | Modolo .................... B62L 3/02 188/344 |
| 6,527,303 | B2 | | 3/2003 | Kariyama et al. |
| 7,565,848 | B2 | | 7/2009 | Fujii |
| 7,578,375 | B2 | * | 8/2009 | Lin ............................ B60T 7/10 188/344 |
| 8,393,246 | B2 | * | 3/2013 | Poertner .............. B62K 21/125 74/489 |
| 8,453,534 | B2 | * | 6/2013 | Tsai ......................... B62L 3/02 74/502.2 |
| 9,630,677 | B2 | * | 4/2017 | Jordan ...................... B62L 3/02 |
| 9,869,340 | B2 | * | 1/2018 | Shipman .................. F16C 1/16 |
| 10,167,041 | B2 | * | 1/2019 | Komada ................. B62L 3/023 |
| 2006/0266594 | A1 | * | 11/2006 | Tsai ........................ B62K 23/06 188/24.22 |

(Continued)

*Primary Examiner* — Luis A Gonzalez
(74) *Attorney, Agent, or Firm* — Global IP Counselors, LLP

(57) ABSTRACT

A bar-end device assembly is provided for a tube member of a bicycle. The bar-end device assembly has a base member that includes a mounting portion, a first shoe and a second shoe. The mounting portion is configured to be mounted within an interior of a free end provided on the tube member. The first shoe is configured to engage the interior of the tube member as the mounting portion is mounted to the tube member with the first mounting shoe disposed on the mounting portion. The second shoe is configured to engage the interior of the tube member as the mounting portion is mounted to the tube member with the second mounting shoe disposed on the mounting portion. The first and second shoes have different configurations and are used one at a time to change an effective mounting dimension of the base member.

15 Claims, 17 Drawing Sheets

(56) References Cited

U.S. PATENT DOCUMENTS

| | | | |
|---|---|---|---|
| 2009/0121451 A1* | 5/2009 | Chiang | B62J 1/08 |
| | | | 280/288.4 |
| 2009/0152063 A1* | 6/2009 | Tsai | B60T 11/16 |
| | | | 188/344 |
| 2011/0031079 A1* | 2/2011 | Matsushita | B60T 7/102 |
| | | | 188/344 |
| 2014/0041379 A1* | 2/2014 | Ruckh | B62L 3/023 |
| | | | 60/594 |
| 2016/0221632 A1 | 8/2016 | Fujiwara et al. | |
| 2016/0327067 A1 | 11/2016 | Fujiwara et al. | |
| 2016/0347415 A1 | 12/2016 | Katsura et al. | |

* cited by examiner

BAR-END DEVICE ASSEMBLY FOR TUBE MEMBER OF BICYCLE

BACKGROUND

Field of the Invention

This invention generally relates to a bar-end device assembly for a tube member of a bicycle. More specifically, the present invention relates to a bar-end device assembly that is partially mounted inside a tube member of a bicycle.

Background Information

Typically, most bicycles are provided with operating devices that are used to operate various bicycle components of the bicycle. In some cases, the operating devices are provided on a handlebar of the bicycle. The operating devices are mounted in different locations on the handlebar depending on the configuration of the handlebar. In some instances, the operating device is mounted at a free end of the handlebar. These types of operating devices that are mounted at a free end of the handlebar are sometimes called "bar-end operating devices". Some bar-end operating devices can operate one or more bicycle components. For example, these bar-end operating devices can include both a shift operating device and a brake operating device. One example of a bar-end operating device having an attachment portion that is disposed inside the end of the bull horn handlebar is disclosed in U.S. Pat. No. 7,565,848 (assigned to Shimano, Inc.).

SUMMARY

Generally, the present disclosure is directed to various features of a bar-end device assembly that is mounted to a tube member of a bicycle. In one embodiment, the bar-end device assembly is configured to be capable, of being mounted to different sizes of handlebars.

In view of the state of the known technology and in accordance with a first aspect of the present disclosure, a bar-end device assembly is provided for a tube member of a bicycle. The bar-end device assembly basically comprises a base member that includes a mounting portion, a first shoe and a second shoe. The mounting portion is configured to be mounted within an interior of a free end provided on the tube member. The first shoe is configured to engage the interior of the tube member in a first mounted state where the mounting portion is mounted to the free end of the tube member with the first mounting shoe disposed on the mounting portion. The second shoe is configured to engage the interior of the tube member in a second mounted state where the mounting portion is mounted to the free end of the tube member with the second mounting shoe disposed on the mounting portion. The first and second shoes have different configurations. The first and second shoes are movably mounted one at a time to the mounting portion to change an effective mounting; dimension of the base member.

Advantageously according to the first aspect of the present invention, the bar-end device assembly can be easily attached to handlebars of different sizes and/or shapes.

In accordance with a second aspect of the present invention, a bar-end device assembly is provided for a tube member of a bicycle. The bar-end device assembly basically comprises a base member that includes a mounting portion, a shoe and an adapter. The mounting portion is configured to be mounted within an interior of a free end provided on the tube member. The shoe is movably mounted to the mounting portion of the base member to change an effective mounting dimension of the base member. The adapter is configured to be selectively disposed on at least one of the mounting portion and the shoe to increase the effective mounting dimension of the base member.

Advantageously according to the second aspect of the present invention, the bar-end device assembly can be easily attached to handlebars of different sizes and/or shapes.

In accordance with a third aspect of the present invention, the bar-end device assembly according to the first or second aspect further comprises a hydraulic unit provided on the base member and including a hydraulic cylinder.

Advantageously according to the third aspect of the present invention, the bar-end device assembly can be used as a hydraulic operating device to operate hydraulically operated bicycle components.

In accordance with a fourth aspect of the present invention, the bar-end device assembly according to the third aspect is configured so that the hydraulic cylinder is at least partially disposed inside the tube member in the first and second mounted states.

Advantageously according to the fourth aspect of the present invention, the bar-end device assembly can be relatively compact in size and/or aerodynamically shaped.

In accordance with a fifth aspect of the present invention, the bar-end device assembly according to the third or fourth aspect is configured so that the hydraulic unit includes a reservoir being in fluid communication with the hydraulic cylinder.

Advantageously according to the fifth aspect of the present invention, the bar-end device assembly can provide the necessary amount of hydraulic fluid to operate a hydraulically operated bicycle component.

In accordance with a sixth aspect of the present invention, the bar-end device assembly according to the fifth aspect is configured so that the reservoir is at least partially disposed outside the tube member in the first and second mounted states.

Advantageously according to the sixth aspect of the present invention, the bar-end device assembly can be configured to provide easy access to the reservoir.

In accordance with a seventh aspect of the present invention, the bar-end device assembly according to any one of the third to sixth aspects is configured so that the mounting portion of the base member includes a hydraulic hose connection.

Advantageously according to the seventh aspect of the present invention, the bar-end device assembly can be connected to a hydraulically operated bicycle component using a conventional hydraulic hose.

In accordance with an eighth aspect of the present invention, the bar-end device assembly according to the seventh aspect is configured so that the mounting portion of the base member includes a fluid passage fluidly connecting a cylinder bore of the hydraulic cylinder to the hydraulic hose connection.

Advantageously according to the eighth aspect of the present invention, the bar-end device assembly can be configured such that the cylinder bore can be effectively located in the base member.

In accordance with a ninth aspect of the present invention, the bar-end device assembly according to any one of the third to eighth aspects further comprises an operating member configured to operate the hydraulic unit, and the hydraulic unit further including a piston movably disposed in a cylinder bore of the hydraulic cylinder in response to a movement of the operating member.

Advantageously according to the ninth aspect of the present invention, the bar-end device assembly can pressurize the hydraulic fluid in the hydraulic cylinder in response to movement of the operating member.

In accordance with a tenth aspect of the present invention, the bar-end device assembly according to the ninth aspect further comprises an additional operating member provided on one of the base member and the operating member.

Advantageously according to the tenth aspect of the present invention, the bar-end device assembly can be used for operating a pair of bicycle components.

In accordance with an eleventh aspect of the present invention, the bar-end device assembly according to the ninth or tenth aspect is configured so that the additional operating member includes an electrical switch.

Advantageously according to the eleventh aspect of the present invention, the bar-end device assembly can be used to operate an electrically operated bicycle component.

In accordance with a twelfth aspect of the present invention, the bar-end device assembly according to any one of the first to eleventh aspects is configured so that the base member further includes an abutment that is configured to contact the free end of the tube member.

Advantageously according to the twelfth aspect of the present invention, the bar-end device assembly can be firmly located in a desired position.

In accordance with a thirteenth aspect of the present invention, the bar-end device assembly according to any one of the first to twelfth aspects further comprises an actuator operatively coupled to one of the first and second shoes that is movably mounted to the mounting portion.

Advantageously according to the thirteenth aspect of the present invention, the bar-end device assembly can be easily installed to the handlebar.

In accordance with a fourteenth aspect of the present invention, the bar-end device assembly according to the thirteenth aspect is configured so that the first and second shoes are slidably mounted one at a time to the mounting portion, and the actuator is arranged to move the one of the first and second shoes that is mounted to the mounting portion between a retracted position and an extended position upon operation of the actuator.

Advantageously according to the fourteenth aspect of the present invention, the bar-end device assembly can be easily detached and reattached to the handlebar.

In accordance with a fifteenth aspect of the present invention, the bar-end device assembly according to the thirteenth or fourteenth aspect is configured so that the actuator is accessible from outside of the tube member in the first and second mounted states.

Advantageously according to the fifteenth aspect of the present invention, the bar-end device assembly can be easily detached and reattached to the handlebar.

In accordance with a sixteenth aspect of the present invention, the bar-end device assembly according to the thirteenth or fourteenth aspect is configured so that the mounting portion has an axial length in a range of twenty millimeters to sixty millimeters.

Advantageously according to the sixteenth aspect of the present invention, using one of the first and second shoes or using adapter, the bar-end device assembly can be firmly secured to the handlebar with a contact surface which is provided on the mounting portion and has a short axial length relatively.

In accordance with a seventeenth aspect of the present invention, the bar-end device assembly according to any one of the second to sixteenth aspects is configured so that the adapter is configured to be selectively disposed on an outer surface of the shoe that faces away from the base member such that the adapter contacts an interior surface of the tube member in a mounted state where the base member is mounted to the tube member.

Advantageously according to the seventeenth aspect of the present invention, the bar-end device assembly can be adapted to handlebars having different sizes and/or shapes.

In accordance with an eighteenth aspect of the present invention, the bar-end device assembly according to the seventeenth aspect is configured so that the outer surface of the shoe is convexly curved. Also the adapter has a concave surface configured to receive the outer surface of the shoe, and a convexly curved surface that is configured to contact the interior surface of the tube member.

Advantageously according to the eighteenth aspect of the present invention, the bar-end device assembly can be used with a handlebar having a cylindrical shape at the free end.

In accordance with a nineteenth aspect of the present invention, the bar-end device assembly according to any one of the second to seventeenth aspects is configured so that the adapter is configured to be selectively disposed between the shoe and the base member such that the shoe contacts an interior surface of the tube member in a mounted state where the base member is mounted to the tube member.

Advantageously according to the nineteenth aspect of the present invention, the bar-end device assembly can be used inexpensively adapted to a larger sized handlebar.

In accordance with a twentieth aspect of the present invention, the bar-end device assembly according to any one of the second to seventeenth aspects is configured so that the adapter is configured to be selectively disposed on an opposite side of the base member with respect to the shoe such that the adapter and the shoe contact an interior surface of the tube member in a mounted state where the base member is mounted to the tube member.

Advantageously according to the twentieth aspect of the present invention, the bar-end device assembly can be used inexpensively adapted to a larger sized handlebar.

Also other objects, features, aspects and advantages of the disclosed bar-end device assembly will become apparent to those skilled in the art from the following detailed description, which, taken in conjunction with the annexed drawings, discloses preferred embodiments of the bar-end device assembly.

BRIEF DESCRIPTION OF THE DRAWINGS

Referring now to the attached drawings which form a part of this original disclosure.

DETAILED DESCRIPTION OF EMBODIMENTS

Figure 1:
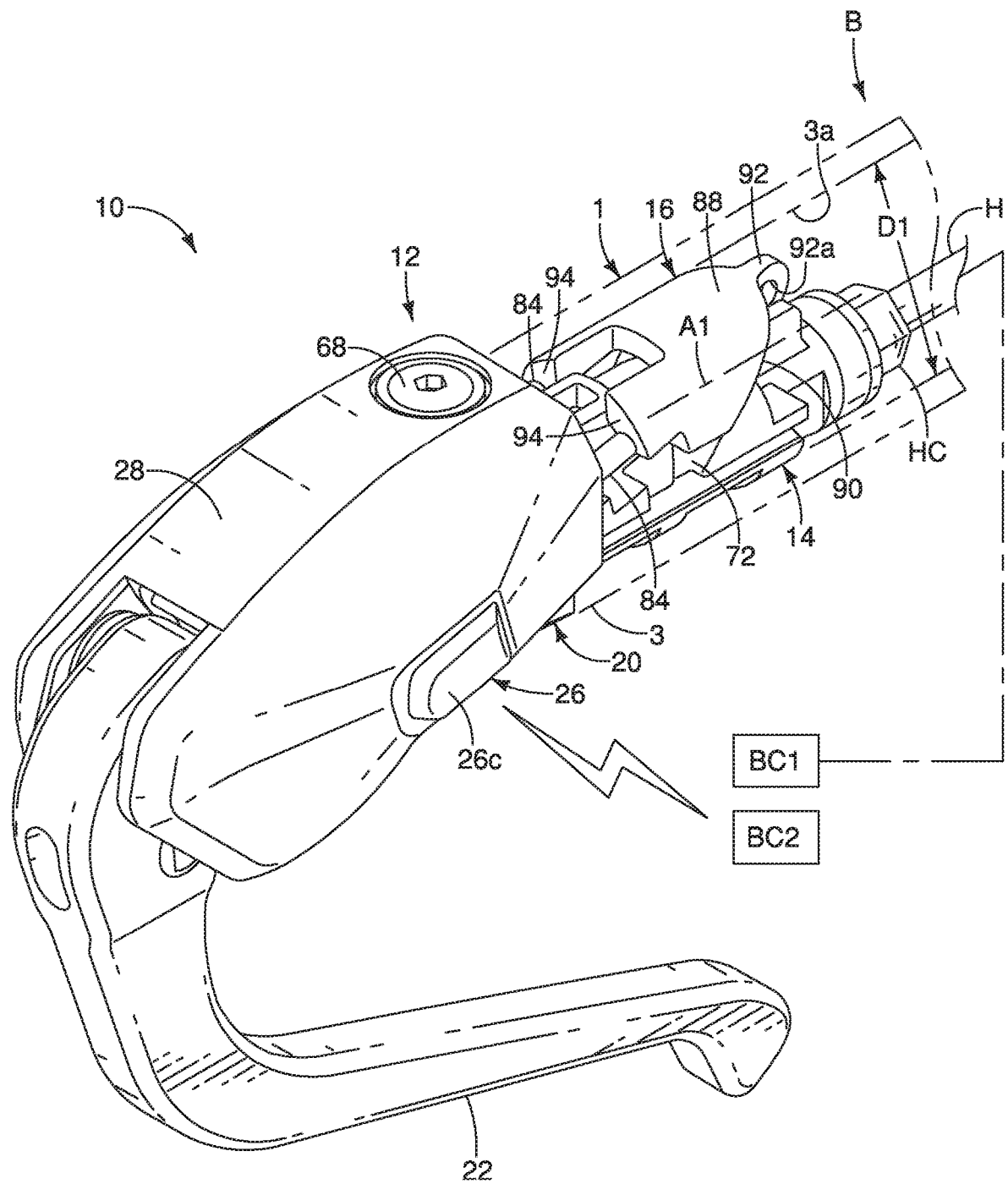
FIG. 1 is a perspective view of a bar-end device assembly attached to a right side of a first bicycle handlebar using a first shoe in accordance with a first illustrated embodiment.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents. Here, like reference numerals designating corresponding or identical elements will be used throughout the various drawings for each of the illustrated embodiments.

Figure 2:
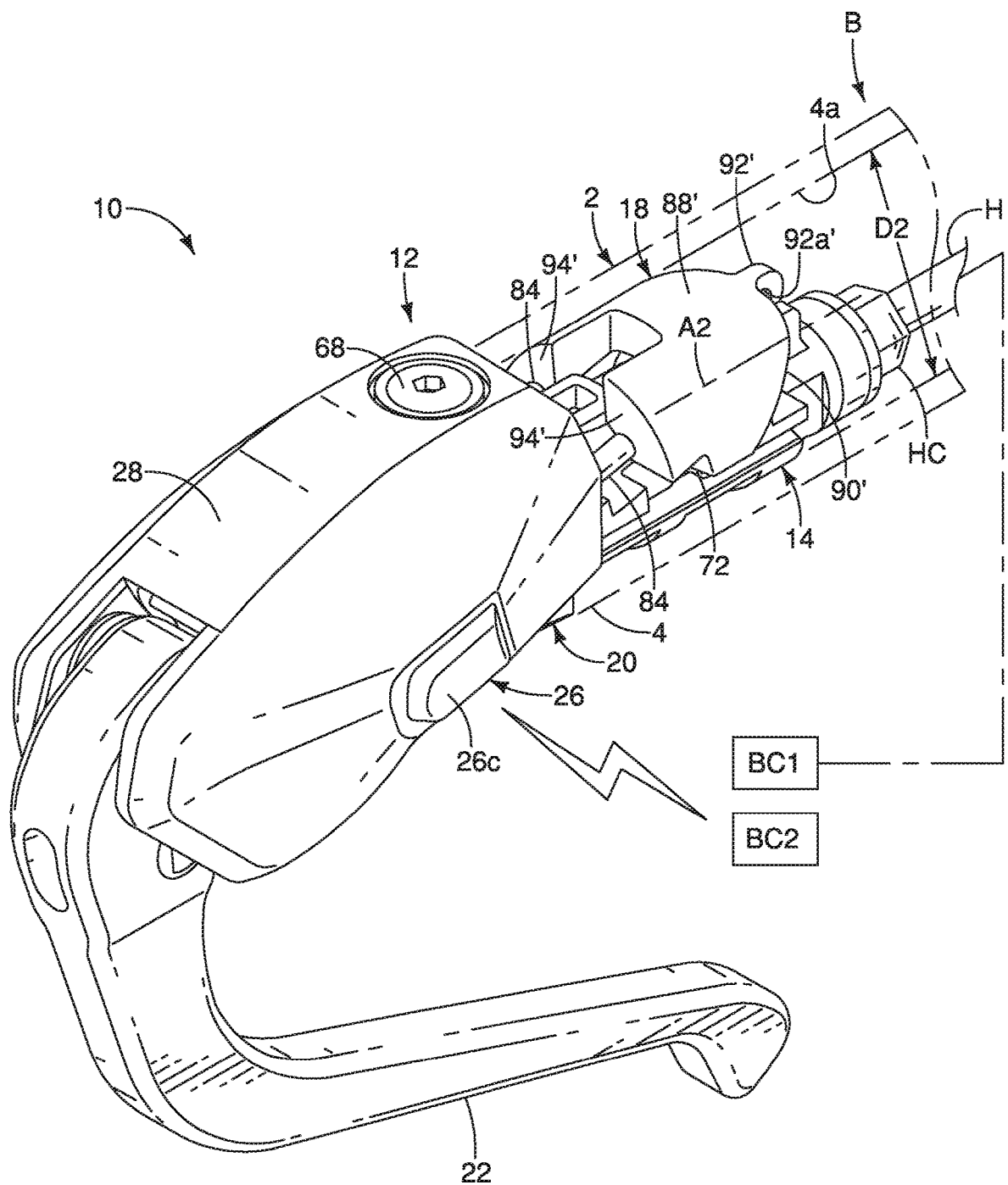
FIG. 2 is a perspective view of the bar-end device assembly attached to a right side of a second bicycle handlebar using a second shoe in accordance with the first illustrated embodiment.

Referring initially to FIGS. 1 and 2, in accordance with a first embodiment, a first end portion of a first bicycle handlebar 1 is illustrated in FIG. 1 in which a bar-end device assembly 10 is mounted, and a second end portion of a second bicycle handlebar 2 is illustrated in FIG. 2 in which the bar-end device assembly 10 is mounted. As explained below, the bar-end device assembly 10 is configured such that the user (e.g., the rider) can selectively mount the bar-end device assembly 10 to bicycle handlebars having a variety of shapes and sizes.

The first and second bicycle handlebars 1 and 2 are examples of tube members that are selectively mounted one at a time to a bicycle B (only the first and second end portions of the first and second bicycle handlebars 1 and 2 are shown herein). Typically, the first and second bicycle handlebars 1 and 2 are one of a time trial handlebar, a bull horn handlebar and a flat handlebar. However, the bar-end device assembly 10 can be mounted to other type of handlebars or tube members of the bicycle B as needed and/or desired. Accordingly, broadly speaking, the bar-end device assembly 10 is provided for a tube member (e.g., the first and second bicycle handlebars 1and 2) of a bicycle.

The first bicycle handlebar 1 has a free end 3 in which the bar-end device assembly 10 is mounted as seen in FIG. 1, while the second bicycle handlebar 2 has a free end 4 in which is mounted the bar-end device assembly 10 as seen in FIG. 2. Here, the free end 3 of the first bicycle handlebar 1 has a first inner diameter D1 and a center longitudinal axis A1. Similarly, the free end 4 of the second bicycle handlebar 2 has a second inner diameter D2 and a center longitudinal axis A2. The second inner diameter D2 is larger than the first inner diameter D1. While the free ends 3 and 4 of the first and second bicycle handlebars 1 and 2 are illustrated as being cylindrical, the free ends 3 and 4 of the first and second bicycle handlebars 1 and 2 are not limited to being cylindrical. Thus, the term "tube member" as used herein includes tubes having non-cylindrical shapes.

In this first embodiment, the bar-end device assembly 10 is a bicycle component operating device that includes both a braking function and a shifting function. For example, the bar-end device assembly 10 is configured to be operated by a user (e.g., a rider) to actuate a first bicycle component BC1 such as a hydraulic brake device and a second bicycle component BC2 such as an electric gear changing device (e.g., an internal geared hub, derailleur, etc.). Since the bar-end device assembly 10 is configured to operate both a hydraulic brake device (e.g., the first bicycle component BC1) and an electric shifting device (e.g., the second bicycle component BC2), the bar-end device assembly 10 is also known as a bicycle brifter. In other words, a bicycle brifter is a device that includes both a braking function and a shifting function in a single unit that is mounted to the bicycle. However, it will be apparent to those skilled in the bicycle field from this disclosure that the bar-end device assembly 10 can be configured to only perform a single function such as a braking function or a shifting function, or some other function such as operating a suspension or an adjustable seatpost with electricity or cable operation. Also in the first embodiment, the braking function is hydraulically carried out, while the shifting function is electrically carried out using wireless communications. However, it will be apparent to those skilled in the bicycle field from this disclosure that the bar-end device assembly 10 is not limited to the illustrated configuration.

In the illustrated embodiment, the bar-end device assembly 10 is a right-hand side control/operating device that is configured to be operated by a rider's right hand to actuate the first and second bicycle components BC1 and BC2. However, the construction of the bar-end device assembly 10 can be applied to a left-hand side control/operating device as needed and/or desired.

Figure 3:
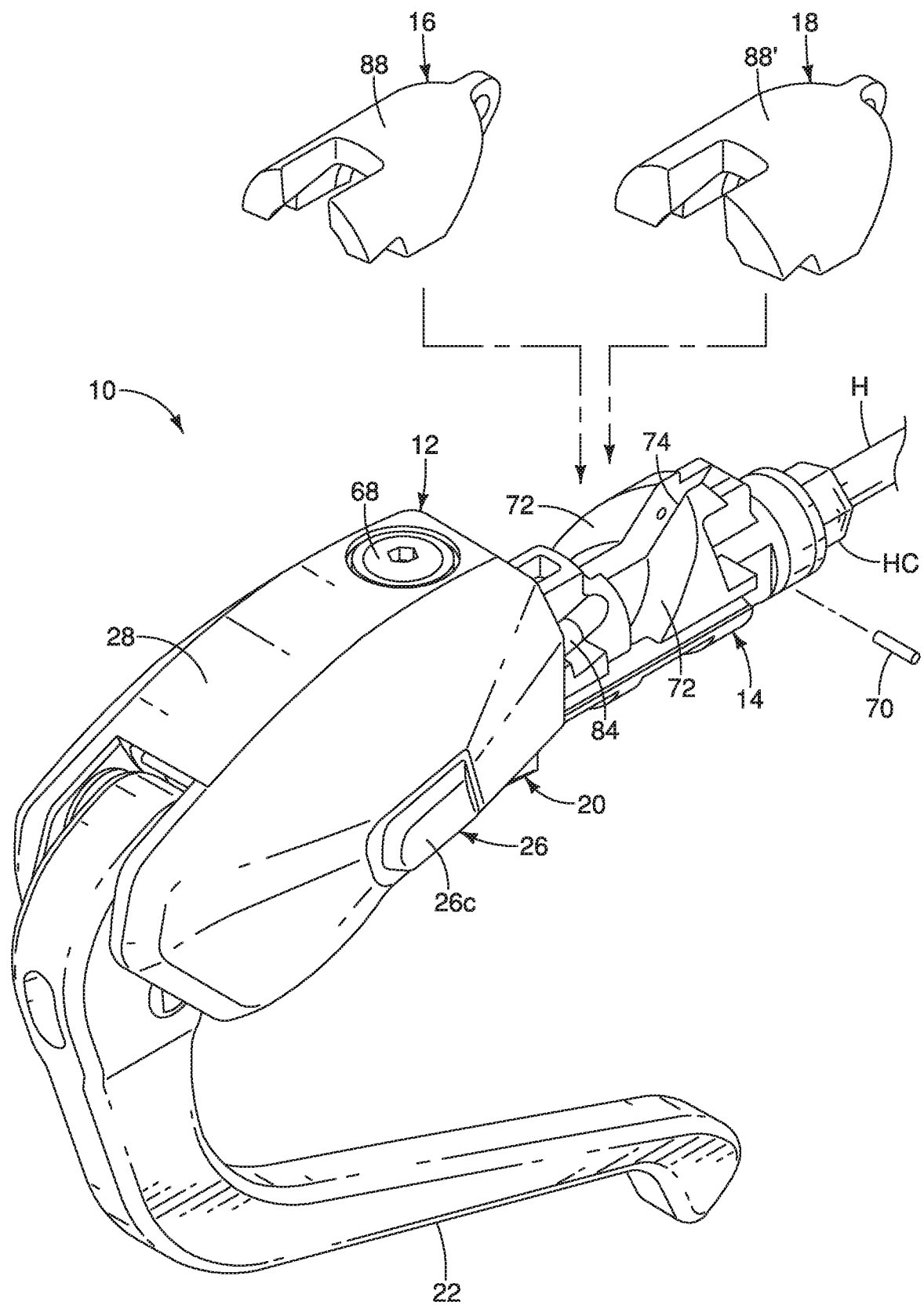
FIG. 3 is a perspective view of the bar-end device assembly with the first and second shoes exploded from a mounting portion of a base member of the bar-end device assembly illustrated in FIGS. 1 and 2 such that one of first and second shoes can be selectively attached to the mounting portion.

As seen in FIGS. 1 to 3, the bar-end device assembly 10 comprises a base member 12. The base member 12 includes a mounting portion 14, a first shoe 16 and a second shoe 18. The first and second shoes 16 and 18 have different configurations. The first shoe 16 is used for tube members such as the first bicycle handlebar 1 having a first predetermined interior dimension, while the second shoe 18 is used for tube members such as the second bicycle handlebar 2 having a second predetermined interior dimension that is larger than the first predetermined interior dimension. The first and second shoes 16 and 18 are mounted one at a time to the mounting portion 14 to change an effective mounting dimension of the base member 12. In this way, the bar-end device assembly 10 can be mounted to either the first bicycle handlebar 1 as shown in FIG. 1 or the second bicycle handlebar 2 as shown in FIG. 2.

Figure 15:
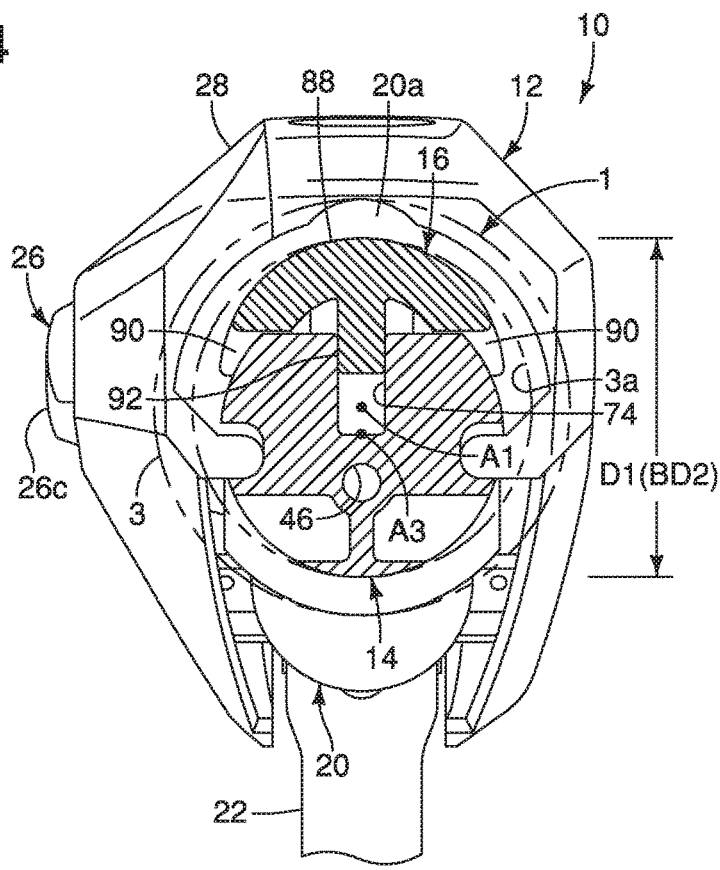
FIG. 15 is a transverse cross sectional view of the bar-end device assembly as seen along section line 15-15 of FIG. 8 with the base member inserted into the interior of the handlebar and the first (smaller) shoe in the extended position on the mounting portion of the base member.
Figure 16:
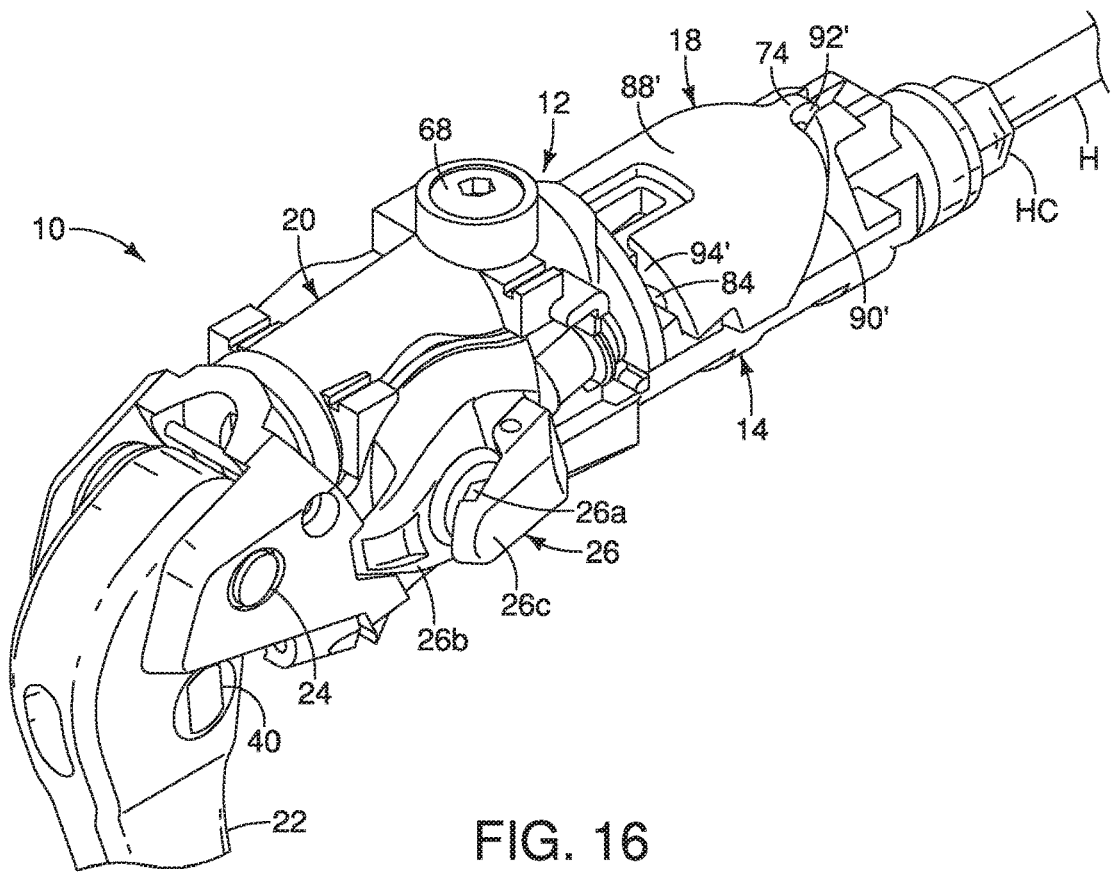
FIG. 16 is a perspective view of the bar-end device assembly illustrated in FIG. 2 with the cover removed from the base member of the bar-end device assembly and the second (larger) shoe in the retracted position on the mounting portion of the base member.

Basically, the first shoe 16 is configured to engage an interior 3a of the first bicycle handlebar 1 the tube member) in a first mounted state where the mounting portion 14 is mounted to the free end 3 of the first bicycle handlebar 1 (i.e., the tube member) with the first shoe 16 disposed on the mounting portion 14. The second shoe 18 is configured to engage an interior 4a of the second bicycle handlebar 2 (i.e., the tube member) in a second mounted state where the mounting portion 14 is mounted to the free end 4 of the second bicycle handlebar 2 the tube member) with the second shoe 18 disposed on the mounting portion 14. The first and second shoes 16 and 18 are movably mounted one at a time to the mounting portion 14 to change an effective mounting dimension of the base member 12. The mounting portion 14 has a center longitudinal axis A3 that extends parallel to the center longitudinal axis A1 of the free end 3 of the first bicycle handlebar 1 in the first mounted state (see FIG. 15), and that extends parallel to the center longitudinal axis A2 of the free end 4 of the second bicycle handlebar 2 in the second mounted state (see FIG. 19).

Figure 4:
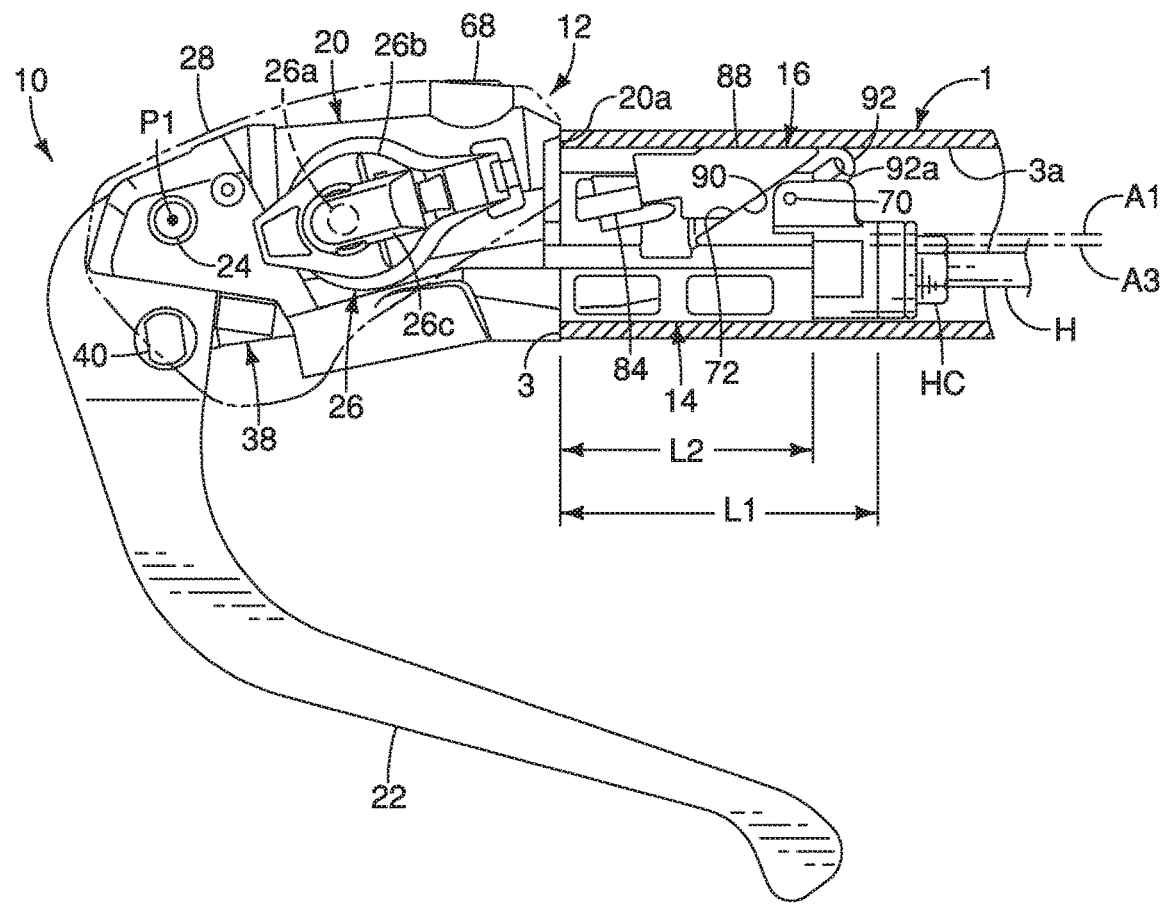
FIG. 4 is an inner (left) side elevational view of the bar-end device assembly illustrated in FIGS. 1 to 3 in which the base member is attached to the first bicycle handlebar using the first shoe and in which a cover of the base member is shown in broken lines and the operating member is shown in a rest position.

The base member 12 further includes a bracket portion 20 that is integrally formed with the mounting portion 14 as a single piece. The mounting portion 14 is configured to be mounted within the interior 3a of the free end 3 that is provided on the first bicycle handlebar 1 (i.e., the tube member). Also the mounting portion 14 is configured to be mounted within the interior 4a of the free end 4 that is provided on the second bicycle handlebar 2 (i.e., the tube member). As seen in FIG. 4, the mounting portion 14 has an axial length L1 in a range of twenty millimeters to sixty millimeters. Preferably, the axial length L1 is set in a range of 30 millimeters to 50 millimeters. More preferably, the axial length L1 is set in a range of 35 millimeters to 45 millimeters. In this embodiment the axial length L1 is approximately 40 millimeters. Further, the mounting portion has a contact surface 15 configured to contact the interior 3a of the free end 3. An axial length L2 of the contact surface 15 is set in a range of ten millimeters to fifty millimeters. Preferably, the axial length L2 is set in a range of twenty millimeters to forty millimeters. More preferably, the axial length L2 is set in a range of twenty-five millimeters to thirty-five millimeters. In this embodiment, the axial length L2 is approximately thirty millimeters. In other words, the axial length L2 is set in a range of 60% to 90% with respect to the axial length L1.

The bracket portion 20 projects from the free end 3 of the first bicycle handlebar 1 in the first mounted state as seen in FIG. 1. Likewise, the bracket portion 20 projects from the free end 4 of the second bicycle handlebar 2 in the second mounted state as seen in FIG. 2. The base member 12 further includes an abutment 20a that is configured to contact the free end 3 of the tube member (e.g., the first bicycle handlebar 1 or the second bicycle handlebar 2). Here, the abutment 20a is formed on the bracket portion 20 and extends substantially perpendicular to the center longitudinal axis A3 of the mounting portion 14.

Figure 5:
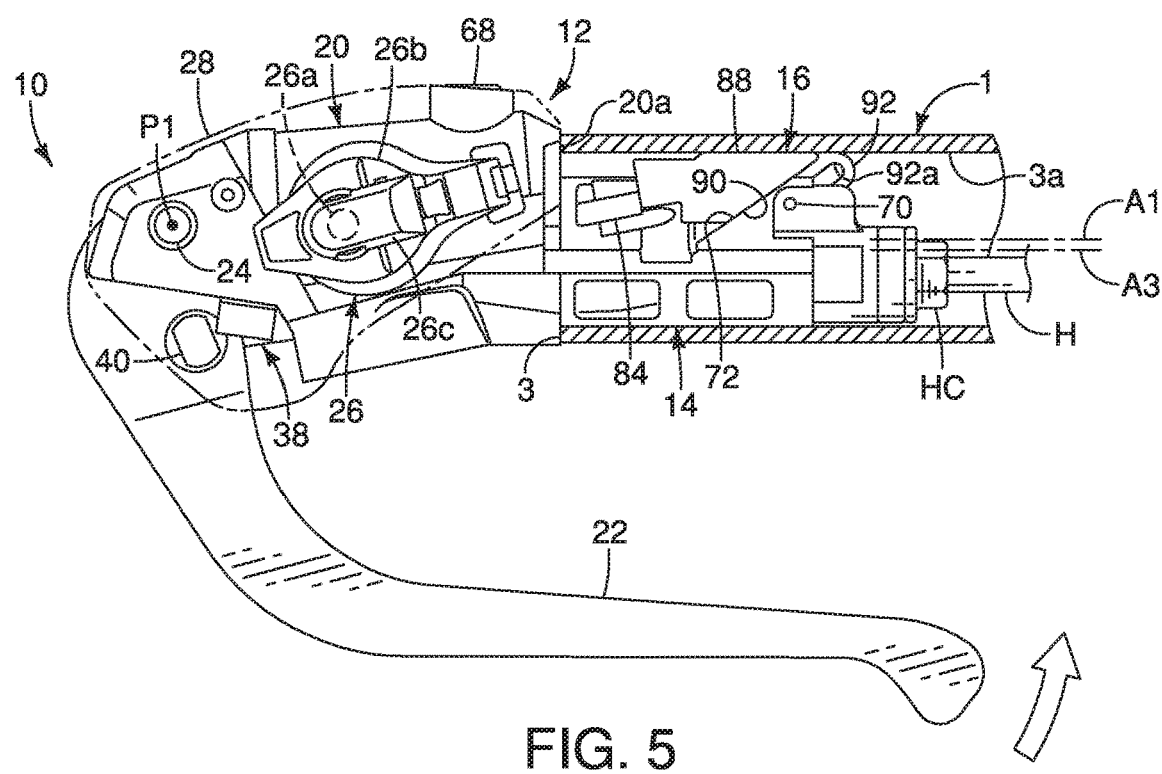
FIG. 5 is an inner (left) side elevational view, similar to FIG. 4, of the bar-end device assembly but with the operating member moved from the rest position to an actuated position.
Figure 6:
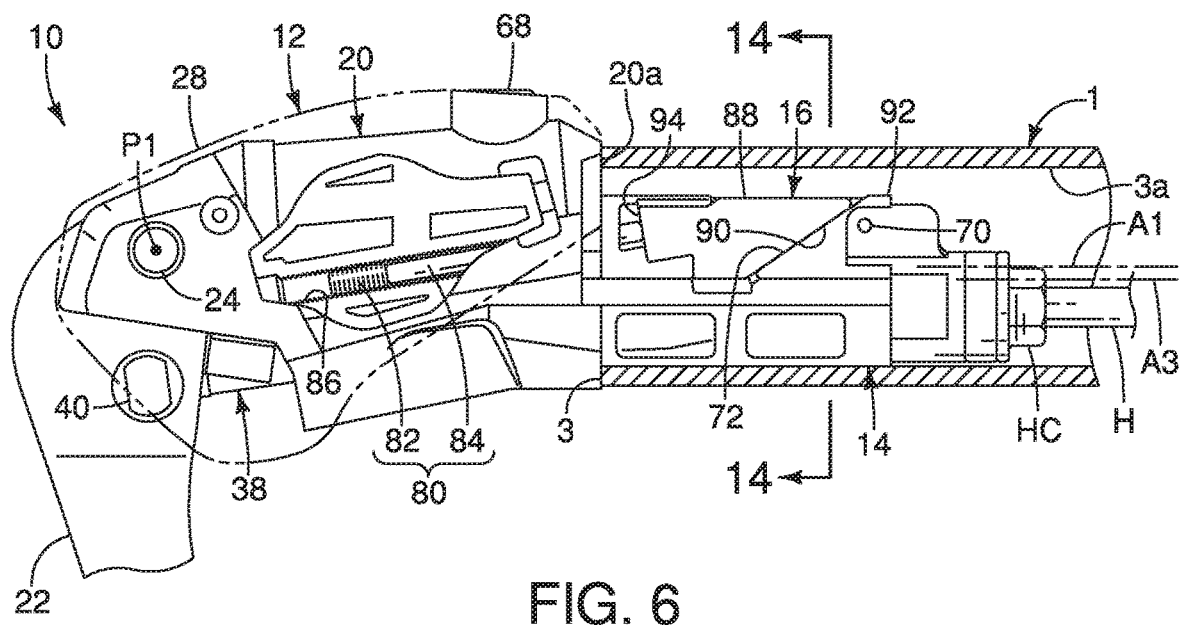
FIG. 6 is an inner (left) side elevational view, similar to FIG. 4, of the bar-end device assembly with the base member inserted into an interior of the first bicycle handlebar but prior to attachment (i.e., the first shoe is in a retracted position) and the electrical switch assembly removed.
Figure 7:
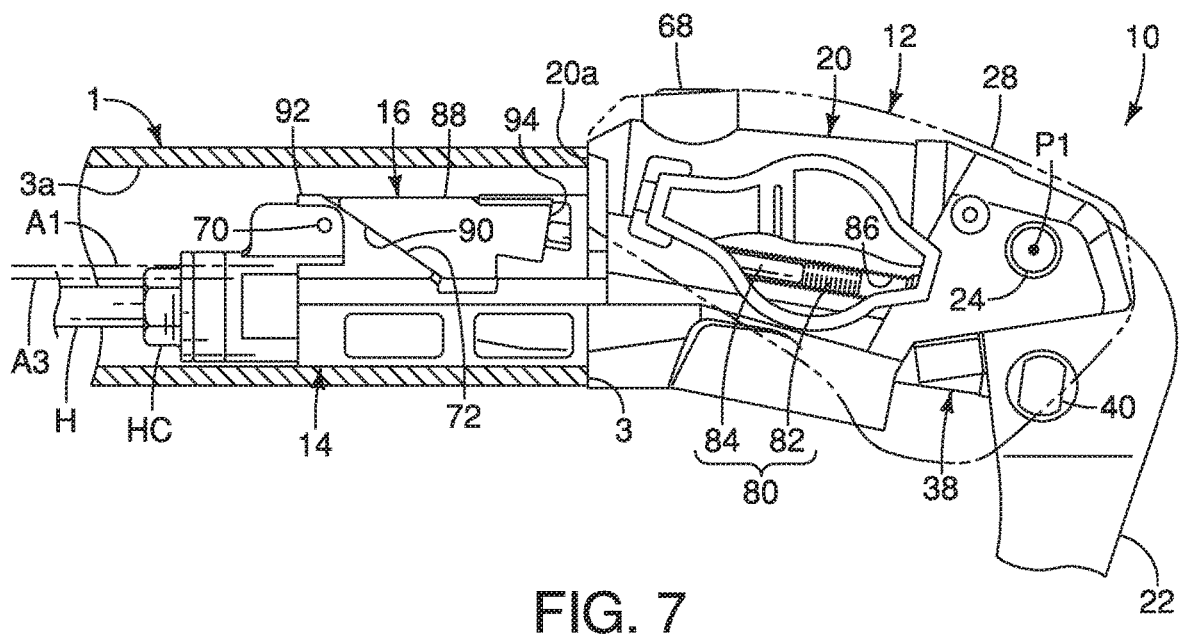
FIG. 7 is an outer (right) side elevational view of the bar-end device assembly illustrated in FIGS. 1 to 6 with the base member inserted into the interior of the first bicycle handlebar but prior to attachment (i.e., the first shoe is in a retracted position)
Figure 8:
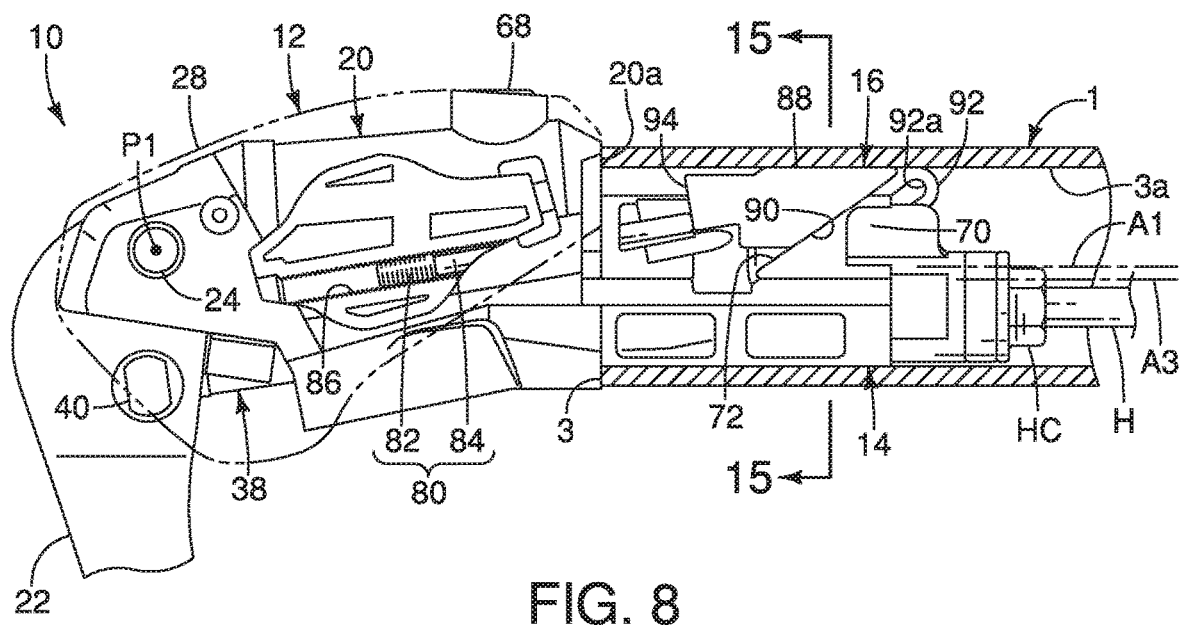
FIG. 8 is an inner (left) side elevational view, similar to FIG. 6, of the bar-end device assembly but with the base member secured in the interior of the first bicycle handlebar using the first shoe.
Figure 9:
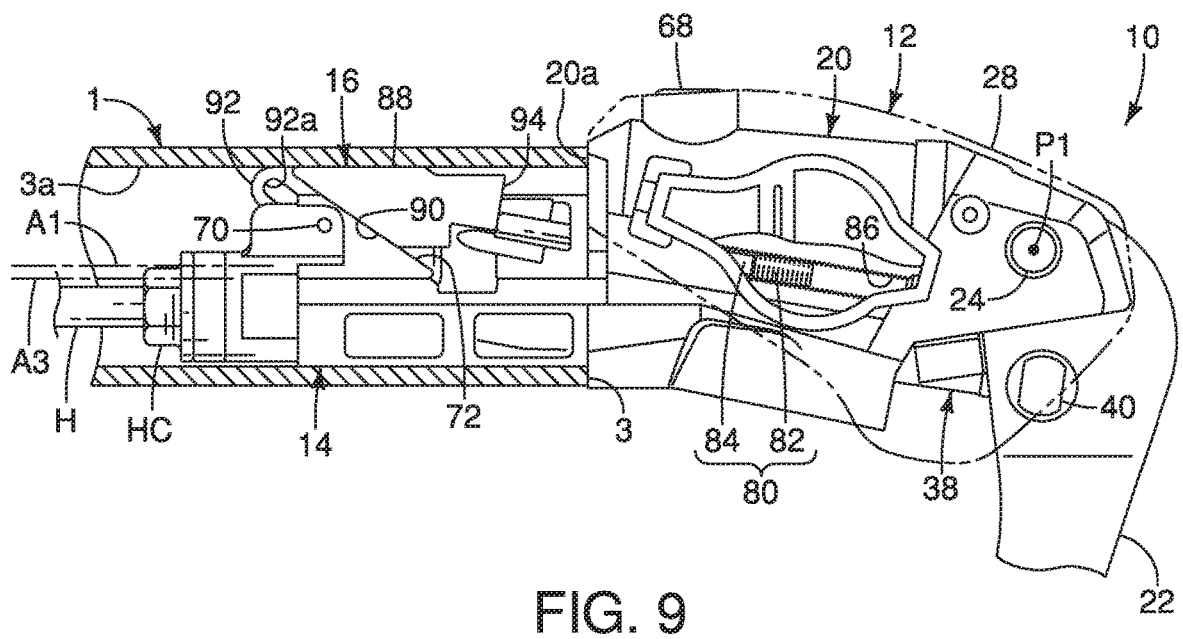
FIG. 9 is an outer (right) side elevational view, similar to FIG. 7, of the bar-end device assembly but with the base member secured in the interior of the first bicycle handlebar using the first shoe.
Figure 10:
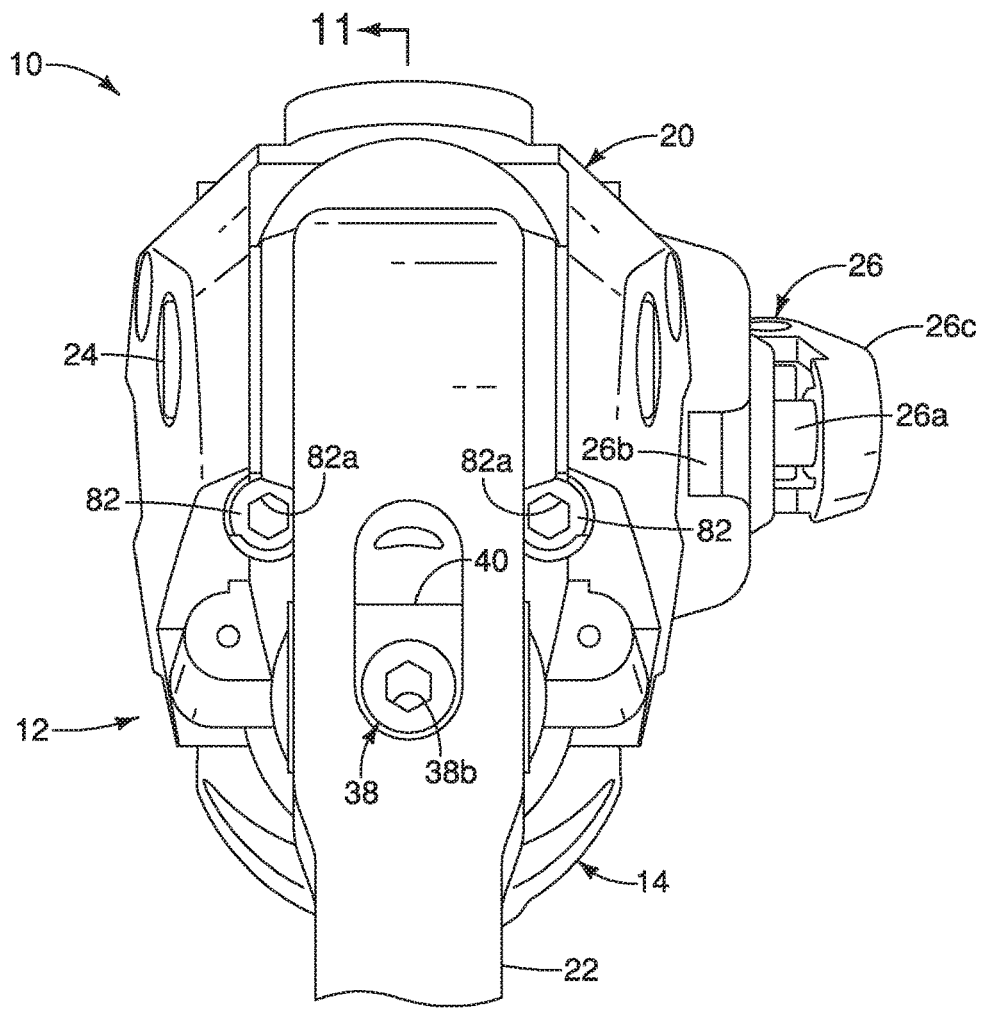
FIG. 10 is a front end oblique view of the bar-end device assembly illustrated in FIGS. 1 to 9 as view in a movement direction of screws of actuators for moving the first or second shoe into and out of engagement with the interior of one of the first and second bicycle handlebars.

Here, the bar-end device assembly 10 further comprises an operating member 22. As seen in FIGS. 4 and 5, the operating member 22 is pivotally mounted to the bracket portion 20 of the base member 12 by a pivot pin 24. Namely, the operating member 22 is provided as a lever pivotally mounted on the bracket portion 20. The pivot pin 24 defines a pivot axis P The user or rider actuates the operating member 22 by pivoting the operating member 22 on the pivot pin 24 from a rest position (FIG. 4) to an actuated position (FIG. 5) for operating the first bicycle component BC1 to perform a braking operation. The term "rest position" as used herein refers to a state in which a movable part (e.g., the operating member 22) remains stationary without the need of a user intervening (e.g., holding the operating member 22) to establish a state corresponding to the rest position. Thus, the term "rest position" can also be referred to as a non-operated position.

Also here, the bar-end device assembly 10 further comprises an additional operating member 26. However, the additional operating member 26 can be omitted from bar-end device assembly 10. The additional operating member 26 can be provided on one of the base member 12 and the operating member 22. In the first embodiment, the additional operating member 26 is provided on the bracket portion 20 of the base member 12 for operating the second bicycle component BC2 to perform a shifting operation.

Here, the additional operating member 26 includes an electrical switch 26a. The electrical switch 26a is configured to receive a user input to operate the second bicycle component BC2. The electrical switch 26a is attached to the bracket portion 20 of the base member 12 by a switch housing 26b. Here, the additional operating member 26 includes a user input member 26c pivotally supported on the switch housing 26b. The electrical switch 26a is actuated by the user input member 26c in response to a pivotal movement of the user input member 26c. In the first embodiment, the base member 12 further comprises a cover 28 that substantially conceals the bracket portion 20 of the base member 12 and the additional operating member 26. Here, the cover 28 is made of two parts that are attached to opposite side faces of the bracket portion 20. The user input member (button) 26c projects through an opening of the cover 28 to receive the user input. In the first embodiment, the electrical switch 26a is an electrical pushbutton switch such as a normally open switch. However, the electrical switch 26a can have another configuration. The switch housing 26b also houses a printed circuit board having a processor (not shown) and a wireless communication circuit (not shown). Accordingly, when the electrical switch 26a is operated (pushed), the wireless communication circuit outputs a wireless signal to the second bicycle component BC2 to perform a shifting operation. Alternatively, the electrical switch 26a can be connected to the second bicycle component BC2 by an electrical wire as needed and/or desired. Also alternatively, the additional operating member 26 can be replaced with a mechanical operating member that is configured to pull and release an inner wire of a mechanical control cable such as a Bowden cable.

Figure 11:
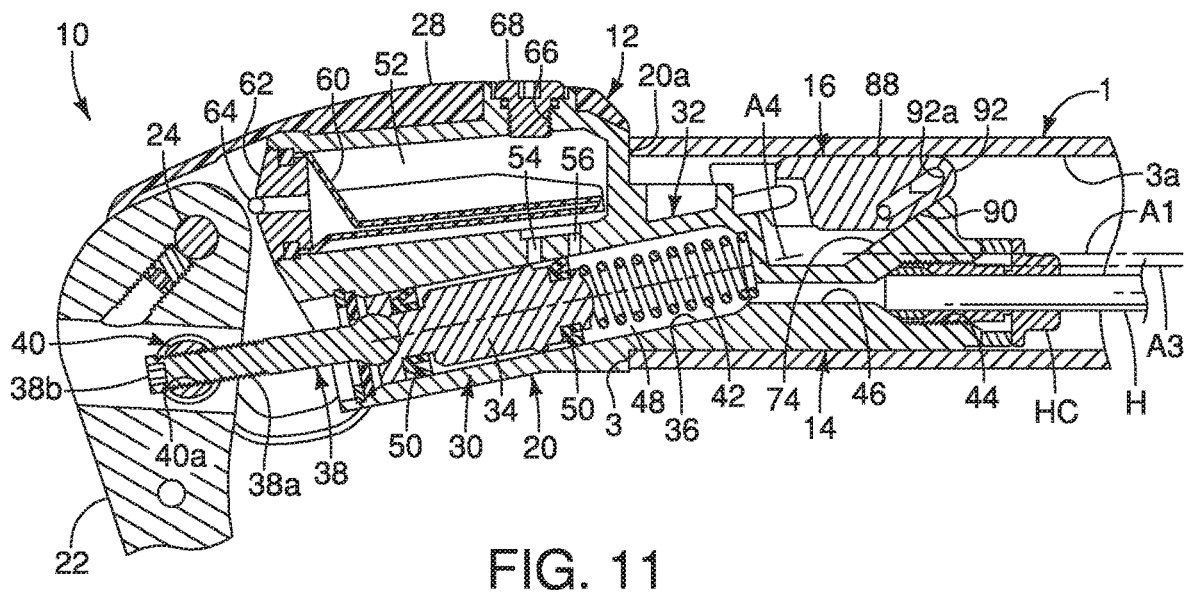
FIG. 11 is a partial longitudinal cross sectional view of the bar-end device assembly as seen along section line 11-11 of FIG. 10.
Figure 12:
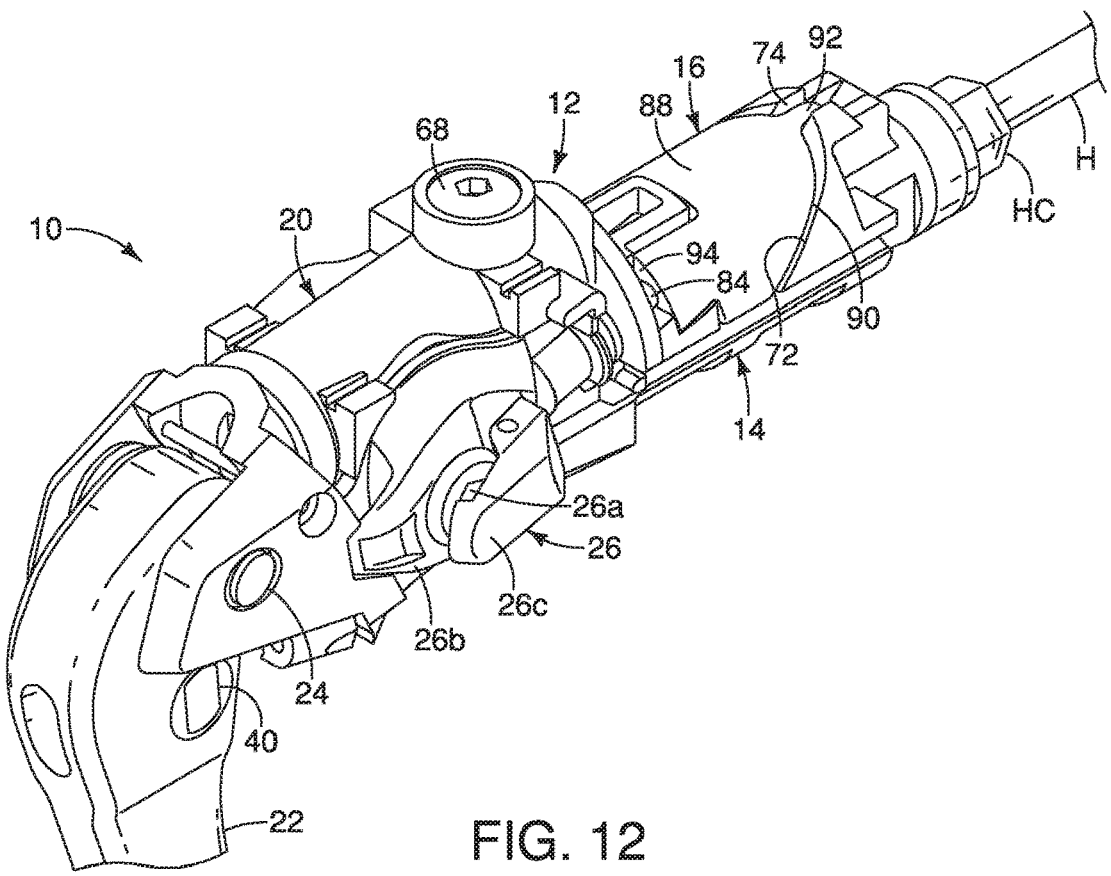
FIG. 12 is a partial perspective view of the bar-end device assembly illustrated in FIG. 1 with the cover removed from the base member of the bar-end device assembly and the first (smaller) shoe in the retracted position on the mounting portion of the base member.
Figure 13:
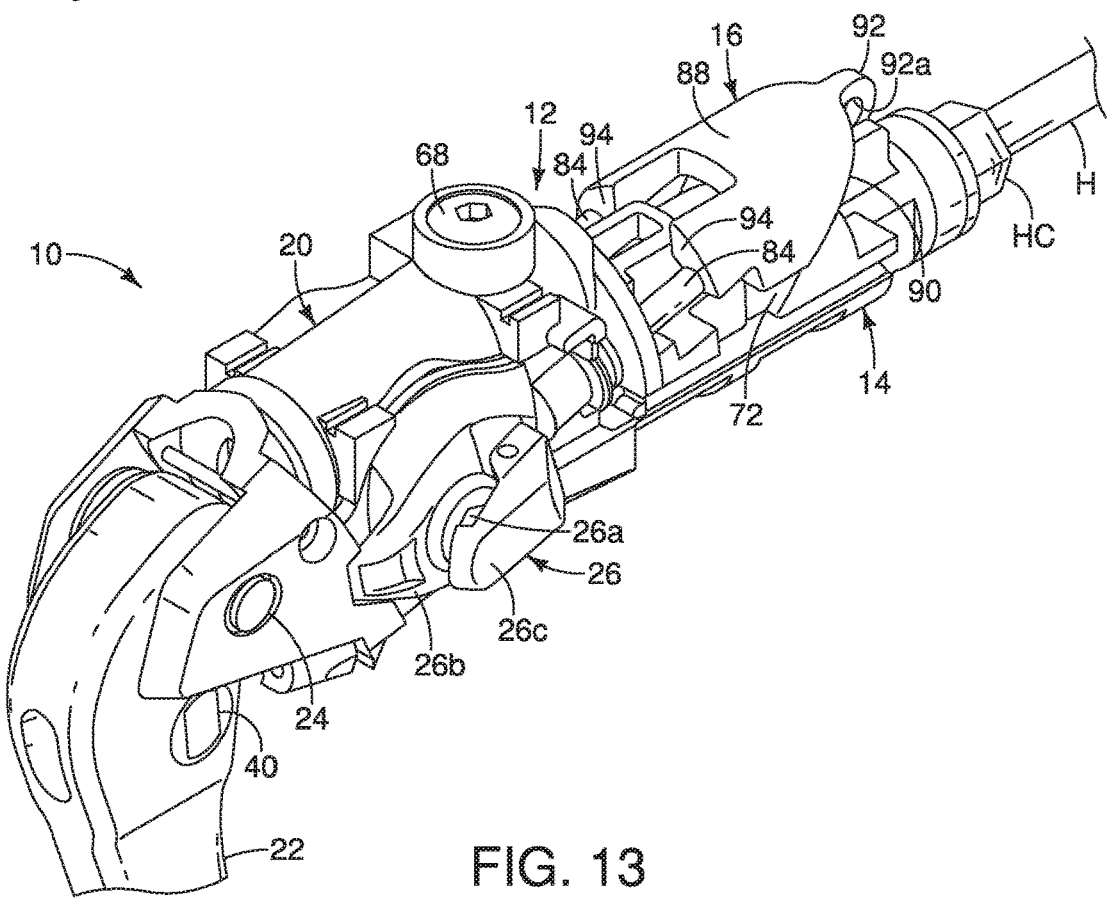
FIG. 13 is a partial perspective view, similar to FIG. 12, of the bar-end device assembly but with the first (smaller) shoe in the extended position on the mounting portion of the base member.
Figure 14:
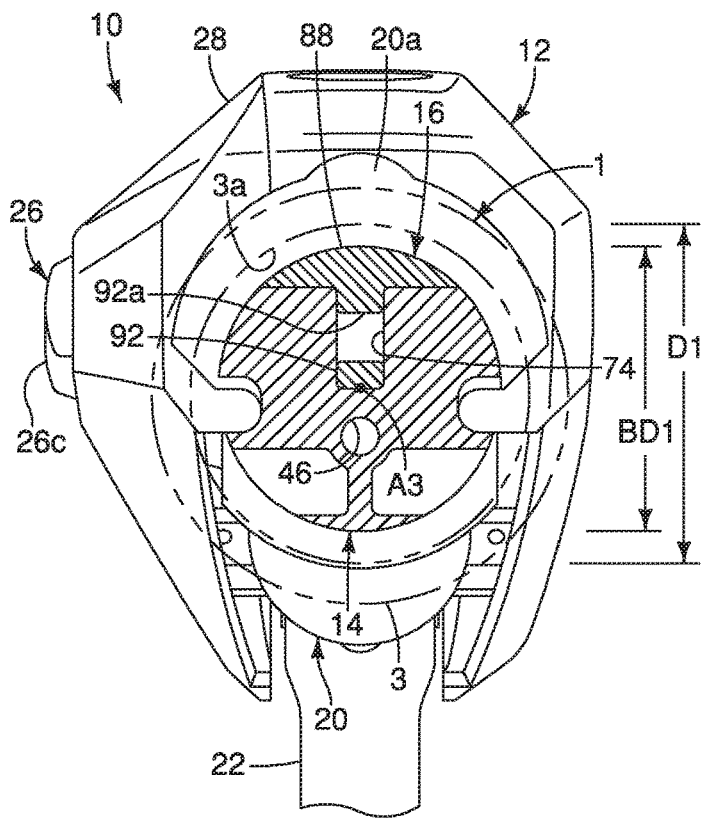
FIG. 14 is a transverse cross sectional view of the bar-end device assembly as seen along section line 14-14 of FIG. 6 with the base member inserted into the interior of the handlebar and the first (smaller) shoe in the retracted position on the mounting portion of the base member.

In the first embodiment, as seen in FIG. 11, the bar-end device assembly 10 further comprises a hydraulic unit 30 that is provided on the base member 12. The operating member 22 is configured to operate the hydraulic unit 30. As seen in FIGS. 4 and 5, the operating member 22 pivots from the rest position (FIG. 4) to the actuated position (FIG. 5) for operating the first bicycle component BC1 to perform a braking operation. Here, the hydraulic unit 30 transmits fluid pressure to actuate the first bicycle component BC1 (e.g., a hydraulic brake device). The hydraulic unit 30 includes a hydraulic cylinder 32. The hydraulic cylinder 32 is at least partially disposed inside the tube member (e.g., the first bicycle handlebar 1 or the second bicycle handlebar 2) in the first and second mounted states. In the first embodiment, as seen in FIG. 11, the hydraulic cylinder 32 is partially disposed inside the first bicycle handlebar 1 (i.e., the tube member) and partially disposed outside the first bicycle handlebar 1 (i.e., the tube member).

The hydraulic unit 30 further includes a piston 34 that is movably disposed in a cylinder bore 36 of the hydraulic cylinder 32 in response to a movement of the operating member 22. More specifically, the piston 34 is operatively coupled to the operating member 22 to move in the cylinder bore 36 in response to a pivotal movement of the operating member 22. The hydraulic unit 30 further includes a piston rod 38 and a coupling pin 40 to operatively couple the operating member 22 to the piston 34. In this way, the piston 34 slides in the cylinder bore 36 in response to the pivotal movement of the operating member 22. The coupling pin 40 is rotatably attached to the operating member 22. The coupling pin 40 includes an internally threaded hole 40a. The piston rod 38 includes an external thread 38a that is engaged with the internally threaded hole 40a. The piston rod 38 includes a tool engagement part 38b that is configured to be engaged with a tool. Here, the tool engagement part 38b includes a hexagonal hole configured to be engaged with the tool such as a hexagonal wrench. Rotation of the piston rod 38 changes the rest position of the operating member 22.

A piston biasing element 42 is provided in the cylinder bore 36 to bias the piston 34 toward an initial position, which corresponds to the rest position of the operating member 22. The piston biasing element 42 also biases the operating member 22 to the rest position. In the first embodiment, for example, the piston biasing element 42 includes a coiled spring. However, other types of biasing element can be used to bias the piston 34 and/or the operating member 22 to the rest position.

Here, the cylinder bore 36 has a cylinder center axis A4 that is inclined relative to the center longitudinal axis A3 of the mounting portion 14 by an inclination angle that is preferably equal to or larger than ten degrees and equal to or smaller than approximately, thirty degrees. However, the inclination angle can be between four to sixty degrees. In the first embodiment, as seen in FIG. 11, the cylinder bore 36 is partially disposed in the mounting portion 14. However, the cylinder bore 36 can be entirely provided in the mounting portion 14. The cylinder bore 36 has a circular cross-section. The cylinder center axis A4 is defined to extend through a center of the circular cross-section of the cylinder bore 36. However, the shape of the cylinder bore 36 is not limited to the illustrated configuration.

The mounting portion 14 of the base member 12 includes a hydraulic hose connection 44. In the first embodiment, the hydraulic hose connection 44 is an internally threaded bore that receives a hydraulic hose connector HC that is provided on one end of a hydraulic hose H. The hydraulic hose H fluidly connects the cylinder bore 36 of the hydraulic cylinder 32 to the first bicycle component BC1. The connection of the hydraulic hose connector HC to the hydraulic hose connection 44 is conventional and basically the same as disclosed in U.S. Pat. No. 6,527,303 B2. Thus, the connection of the hydraulic hose connector HC to the hydraulic hose connection 44 will not be discussed or illustrated in detail herein. While an internally threaded bore is used as the hydraulic hose connection in the first embodiment, other types of hydraulic hose connections can be used such as an externally threaded hose connection, a quick disconnect connection, a bayonet connection, etc.

The mounting portion 14 of the base member 12 further includes a fluid passage 46 fluidly connecting the cylinder bore 36 of the hydraulic cylinder 32 to the hydraulic hose connection 44. A hydraulic chamber 48 is defined by a portion of the cylinder bore 36 that is between the piston 34 and the fluid passage 46. The size and volume of the hydraulic chamber 48 changes as the piston 34 is moved in response to the movement of the operating member 22. The hydraulic chamber 48 has the largest volume when the operating member 22 is at the rest position, and the smallest volume when the operating member 22 is pivoted to a completely actuated position in which the operating member 22 cannot be pivoted farther from the rest position. The interface between the piston 34 and the cylinder bore 36 is sealed by a pair of seal members 50. Here, the seal members 50 are O-rings that are attached to the piston 34 and slidably engage the cylinder bore 36.

In the first embodiment, as seen in FIG. 11, the hydraulic unit 30 further includes a reservoir 52 that is in fluid communication with the hydraulic cylinder 32. In particular, the reservoir 52 is fluidly connected to the cylinder bore 36 by a pair of connection ports 54 and 56. The reservoir 52 is at least partially disposed outside the tube member (e.g., the first bicycle handlebar 1 or the second bicycle handlebar 2) in the first and second mounted states. Here, the reservoir 52 is completely disposed in the bracket portion 20 and does not extend into the mounting portion 14 of the base member 12. However, the shape of the reservoir 52 is not limited to this illustrated configuration. The cross-sectional shape of the reservoir 52 can have other shapes including, but not limited to, an oval shape and a polygonal shape. The reservoir 52 is integrally formed as part of the bracket portion 20 of the base member 12. The reservoir 52 can be omitted from the base member 12 as needed and/or desired.

A diaphragm 60 is provided inside the reservoir 52. The diaphragm 60 is made of an elastic material such as rubber. The reservoir 52 and the diaphragm 60 define a reservoir chamber that is fluidly connected to the hydraulic chamber 48 via the connection ports 54 and 56. The reservoir 52 is provided with a lid 62 for installing and removing the diaphragm 60. A lid stopper 64 is secured to the bracket portion 20 to prevent the lid 62 from inadvertently detaching from the bracket portion 20. The lid stopper 64 can be a rod, for example, that is press fitting into a bore formed in the bracket portion 20.

Also, preferably, the reservoir 52 is provided with a bleed hole 66 that is selectively opened and closed with a bleed plug 68. In this way, hydraulic fluid can be added and/or removed from the reservoir 52 as well as to bleed out air bubbles in the hydraulic fluid. The bleed hole 66 extends from the reservoir 52 to an outside of the bracket portion 20 of the base member 12. The bleed plug 68 is detachably attached to the bleed hole 66. In this embodiment, the bleed hole 66 includes an internal thread, and the bleed plug 68 includes an external thread that engages the internal thread of the bleed hole 66. However, the bleed hole 66 and the bleed plug 68 can be omitted from the reservoir 52 as needed and/or desired.

Now, first referring to FIG. 3, the mounting of the bar-end device assembly 10 to the free ends 3 and 4 of the first and second bicycle handlebars 1 and 2 will now be discussed in further detail. As mentioned above, the first and second shoes 16 and 18 are mounted one at a time to the mounting portion 14 to change an effective mounting dimension of the base member 12. Basically, the first and second shoes 16 and 18 are identical except that the second shoe 18 is larger than the first shoe 16.

As seen in FIG. 3, the first and second shoes 16 and 18 are selectively attached to the mounting portion 14 by a mounting pin 70. The mounting portion 14 includes a pair of inclined surfaces 72 for movably supporting the first and second shoes 16 and 18 one at a time on the mounting portion 14. The mounting portion 14 also includes a longitudinal guide recess 74 for selectively guiding the first and second shoes 16 and 18. In this way, the first and second shoes 16 and 18 are slidably mounted one at a time to the mounting portion 14. More specifically, the one of the first and second shoes 16 and 18 that is mounted to the mounting portion 14 slides along the inclined surfaces 72 to move simultaneously in a longitudinal direction and an outward radial direction with respect to the center longitudinal axis A3 of the mounting portion 14.

As seen in FIGS. 6 to 10, the bar-end device assembly further comprises an actuator 80 that is operatively coupled to one of the first and second shoes 16 and 18 that is movably mounted to the mounting portion 14. The actuator 80 is arranged to move the one of the first and second shoes 16 and 18 that is mounted to the mounting portion 14 between the retracted position and the extended position upon operation of the actuator 80. Here, the actuator 80 includes a pair of screws 82 and a pair of push rods 84. The screws 82 threadedly engaged in channels 86 of the base member 12. Thus, the screws 82 are movably mounted in the channels 86 of the base member 12 to push the push rods 84 axially in the channels 86. The push rods 84 extend out of the channels 86 of the base member 12 to push the one of the first and second shoes 16 and 18 that is movably mounted to the mounting portion 14. In this embodiment, the screws 82 are separate members from the pushing rods 84. However, each of the screws 82 can be integrally formed with one of the push rods 84 as a one-piece unitary member. Also, alternatively, the actuator 80 can be constructed using only one of the screws 82 and/or push rods.

As seen in FIG. 11, the actuator 80 is accessible from outside of the tube member in the first and second mounted states. In particular, each of the screws 82 has a tool receiving recess 82a (i.e., a tool engagement structure) for receiving a tool such as a hexagonal wrench. However, the screws 82 can have other types of tool engagement structures that are used for threaded fasteners.

As seen in FIGS. 6 to 9 and 12 to 15, the first shoe 16 is movably mounted to the mounting portion 14 to move between a retracted position (FIGS. 6, 7, 12 and 14) and an extended position (FIGS. 8, 9, 13 and 15). As the first (smaller) shoe 16 is mounted to the mounting portion 14, the mounting portion 14 of the base member 12 has a maximum dimension BD1 with the first shoe 16 in the retracted position and a maximum dimension BD2 with the first shoe 16 in the extended position. Here, the maximum dimension BD2 is substantially equal to or slightly larger than the first inner diameter D1 of the first bicycle handlebar 1.

The first (smaller) shoe 16 basically includes an outer surface 88, a pair of guide surfaces 90, a guide projection 92 and a pair of abutments 94. The outer surface 88 of the first shoe 16 is convexly curved for contacting the interior 3a of the first bicycle handlebar 1 and disposed in the extended position to establish the first mounted state. While the outer surface 88 is illustrated as being smooth, the outer surface 88 can be textured as needed and/or desired. The guide surfaces 90 are inclined surfaces that mate with the inclined surfaces 72 of the mounting portion 14 of the base member 12. In this way, the first shoe 16 moves simultaneously in the longitudinal direction and the outward radial direction with respect to the center longitudinal axis A3 of the mounting portion 14 as the first shoe 16 moves from the retracted position to the extended position. The guide projection 92 is disposed in the guide recess 74 of the mounting portion 14 to maintain the movement of the first shoe 16 along the longitudinal direction as the first shoe 16 moves from the retracted position to the extended position. The guide projection 92 includes a guide slot 92a for receiving the mounting pin 70. The abutments 94 are arranged to be engaged by the push rods 84 for moving the first shoe 16 with respect to the mounting portion 14.

Figure 17:
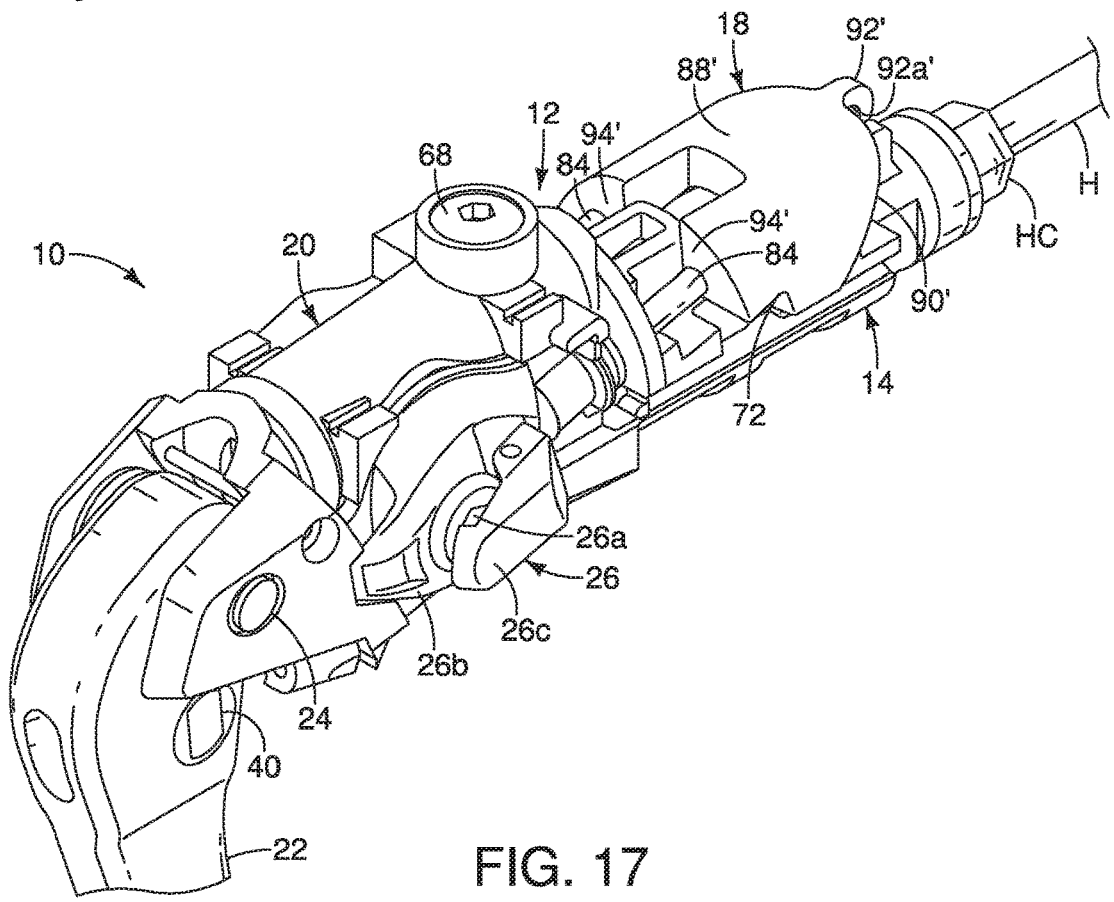
FIG. 17 is a perspective view, similar to FIG. 16, of the bar-end device assembly but with the second (larger) shoe shown in an extended position on the mounting portion of the base member.
Figure 18:
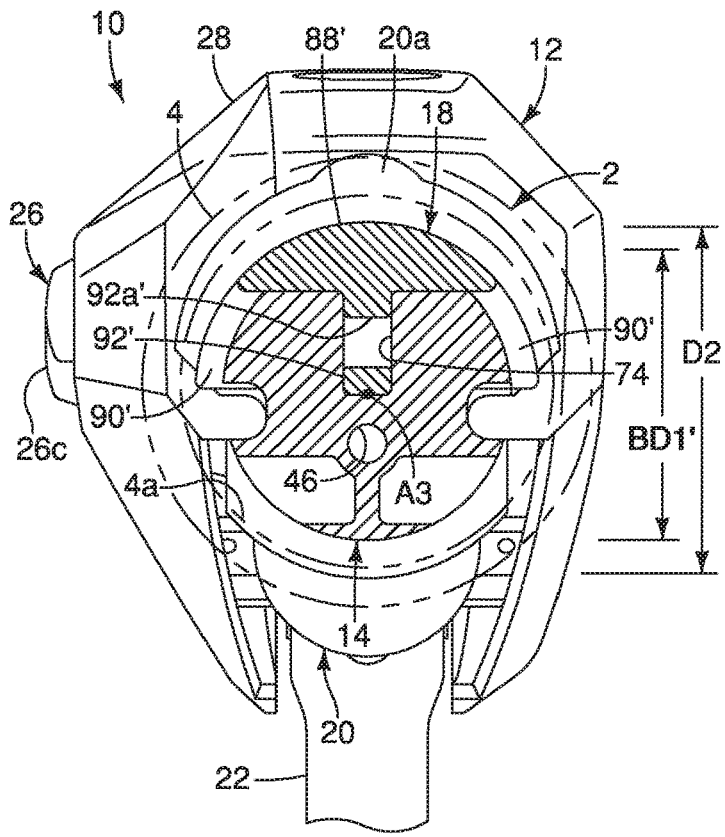
FIG. 18 is a transverse cross sectional view, similar to FIG. 14, of the bar-end device assembly but with the base member inserted into the interior of the second bicycle handlebar and the second (larger) shoe in the retracted position.
Figure 19:
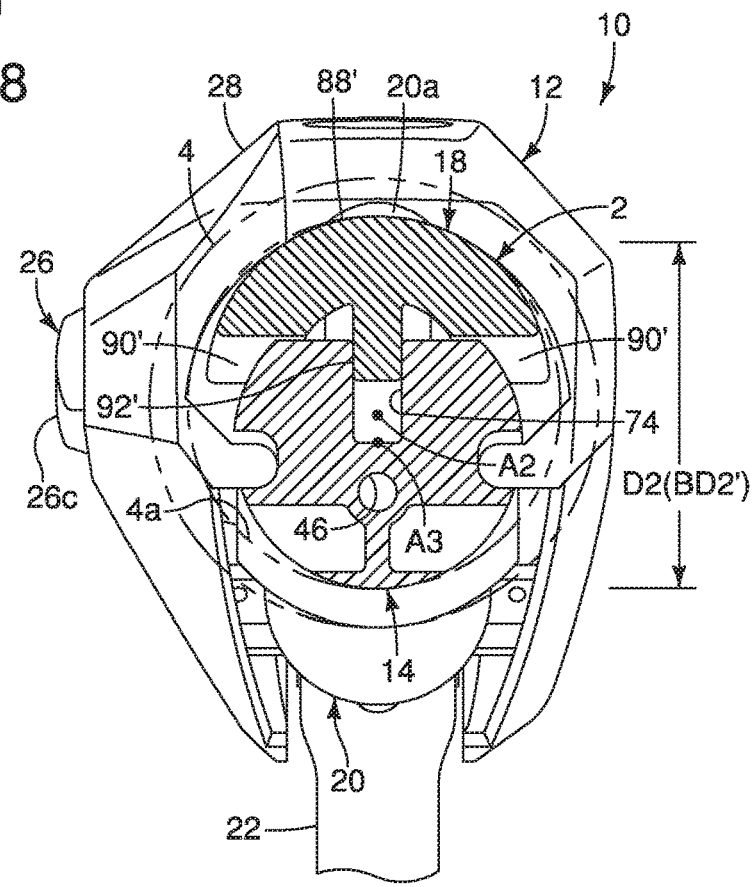
FIG. 19 is a transverse cross sectional view, similar to FIG. 15, of the bar-end device assembly but with the base member inserted into the interior of the second bicycle handlebar and the second (larger) shoe in the extended position.
Figure 20:
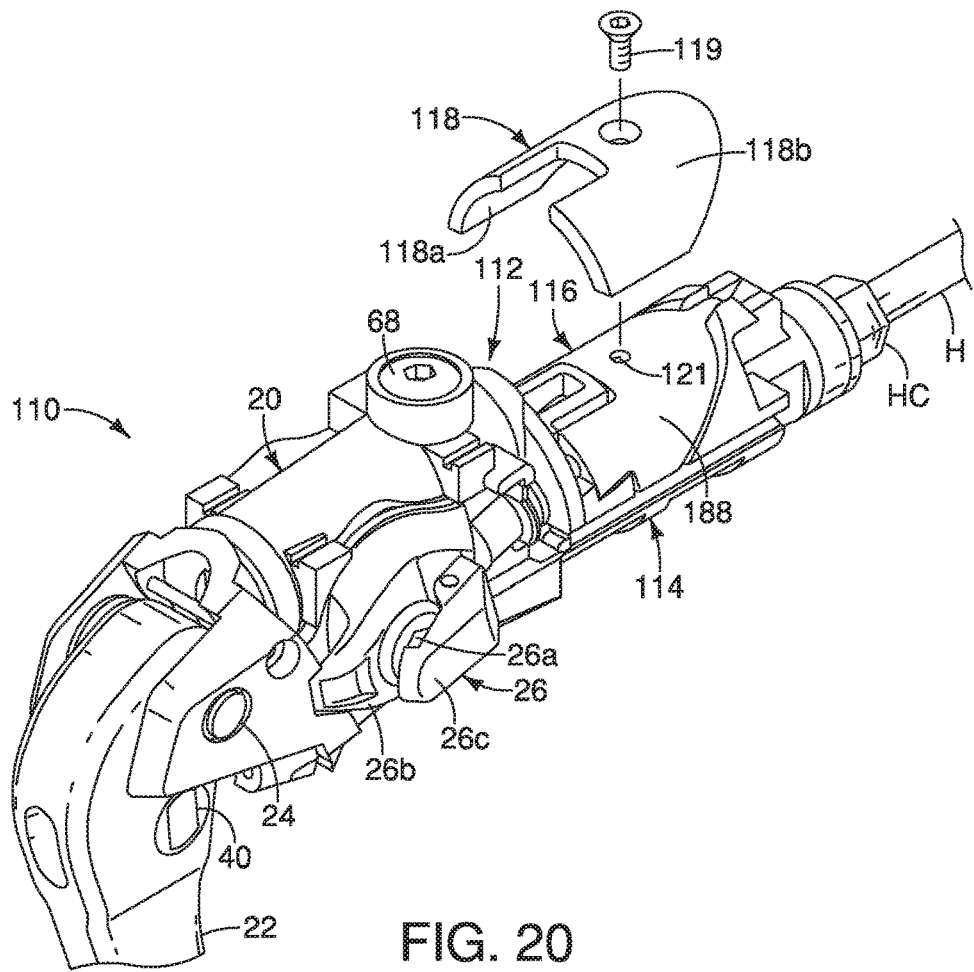
FIG. 20 is a partially exploded perspective view of a bar-end device assembly in accordance with a second embodiment in which the base member includes a modified first shoe and an adapter exploded from the base member.
Figure 21:
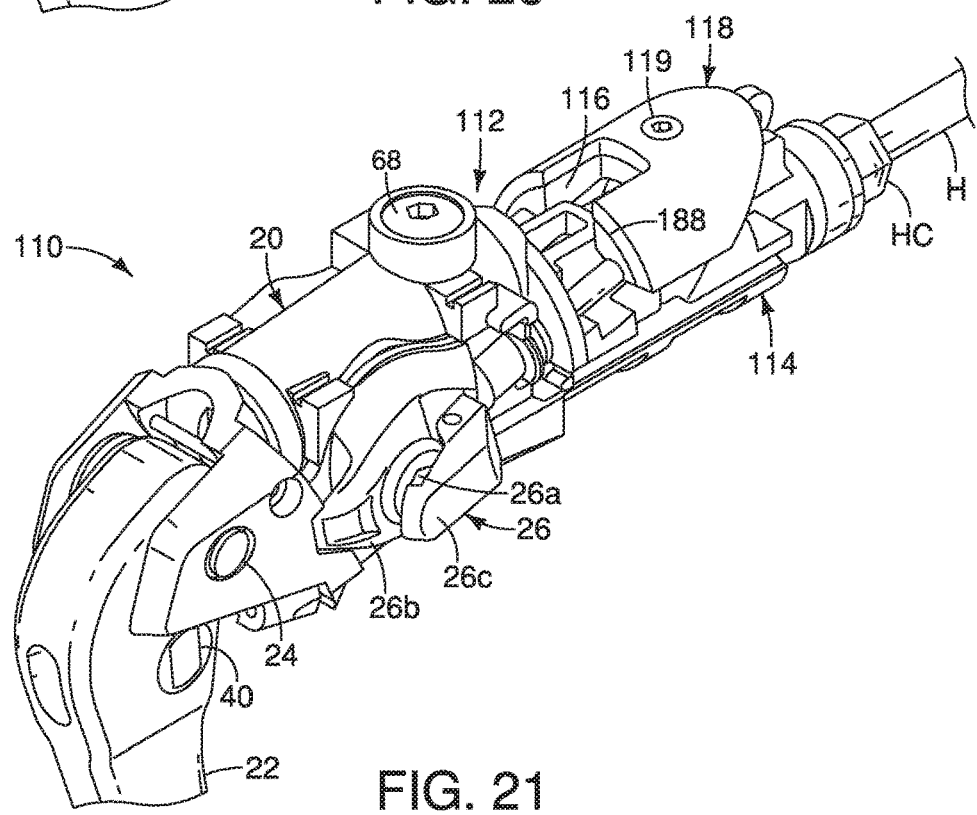
FIG. 21 is a perspective view of the bar-end device assembly illustrated in FIG. 20 with the adapter attached to the modified first shoe, and the modified first shoe and the adapter shown in a retracted position.

Similarly, as seen in FIGS. 15 to 19, the second shoe 18 is movably mounted to the mounting portion 14 to move between a retracted position (FIGS. 16 and 18) and an extended position (FIGS. 17 and 19). As the second (larger) shoe 18 is mounted to the mounting portion 14, the mounting portion 14 of the base member 12 has a maximum dimension BD1' with the second shoe 18 in the retracted position and a maximum dimension BD2' with the second shoe 18 in the extended position. Here, the maximum dimension BD2' is substantially equal to or slightly larger than the second inner diameter D2 of the second bicycle handlebar 2.

The second (larger) shoe 18 basically includes an outer surface 88', a pair of guide surfaces 90', a guide projection 92' and a pair of abutments 94'. The outer surface 88' of the second shoe 18 is convexly curved for contacting the interior 4a of the second bicycle handlebar 2 and disposed in the extended position to establish the second mounted state. The outer surface 88' of the second shoe 18 has a larger radius of curvature than the outer surface 88 of the first shoe 16. While the outer surface 88' is illustrated as being smooth, the outer surface 88' can be textured as needed an/or desired. The guide surfaces 90' are inclined surfaces that mate with the inclined surfaces 72 of the mounting portion 14 of the base member 12. In this way, the second shoe 18 moves simultaneously in the longitudinal direction and the outward radial direction with respect to the center longitudinal axis A3 of the mounting portion 14 as the second shoe 18 moves from the retracted position to the extended position. The guide projection 92' is disposed in the guide recess 74 of the mounting portion 14 to maintain the movement of the second shoe 18 along the longitudinal direction as the second shoe 18 moves from the retracted position to the extended position. The guide projection 92' includes a guide slot 92a' for receiving the mounting pin 70. The abutments 94' are arranged to be engaged by the push rods 84 for moving the second shoe 18 with respect to the mounting portion 14.

While the outer surfaces 88 and 88' of the first and second shoes 16 and 18 are convexly curved surfaces, the outer surfaces 88 and 88' of the first and second shoes 16 and 18 can have other shapes so as to match an interior of a tube member that is not cylindrical. In such a case, the mounting portion 14 can also have an outer surface that matches a non-cylindrical interior of a tube member.

Referring now to FIGS. 20 to 23, a bar-end device assembly 110 in accordance with a second embodiment will now be discussed. Basically, similar to the first embodiment, the bar-end device assembly 110 is provided for a tube member (e.g., the first and second bicycle handlebars 1 and 2) of a bicycle.

Here, the bar-end device assembly 110 comprises a base member 112 that includes a mounting portion 114, a shoe 116 and an adapter 118. The mounting portion 114 is configured to be mounted within an interior of a free end provided on the tube member. Basically, the bar-end device assembly 110 is identical to the bar-end device assembly 10, which is discussed above, except that the shoe 116 and the adapter 118 are used in place of the first and second shoes 16 and 18. As explained below, the shoe 116 is a modified first shoe that has been modified to accommodate attachment of the adapter 118 thereto.

The shoe 116 is movably mounted to the mounting portion 114 of the base member 112 to change an effective mounting dimension of the base member 112. In other words, the base member 112 without using the adapter 118 is mounted to a tube member in the same manner as the base member 12 using the first shoe 16. The adapter 118 is configured to be selectively disposed on an outer surface 188 of the shoe 116 that faces away from the base member 112 such that the adapter 118 contacts an interior surface of the tube member (e.g., the second bicycle handlebar 2) in a mounted state where the base member 112 is mounted to the tube member. In other words, the base member 112 with the adapter 118 is mounted to a tube member in the same manner as the base member 12 using the second shoe 18. Here, the outer surface 188 of the shoe 116 is convexly curved, and the adapter 118 has a concave surface 118a and a convexly curved surface 118b. Accordingly, the concave surface 118a is configured to receive the outer surface 188 of the shoe 116, and the convexly curved surface 118b is configured to contact the interior surface of the tube member. However, the shapes of the shoe 116 and the adapter 118 can be different depending on the shape of the interior surface of the tube member.

Figure 22:
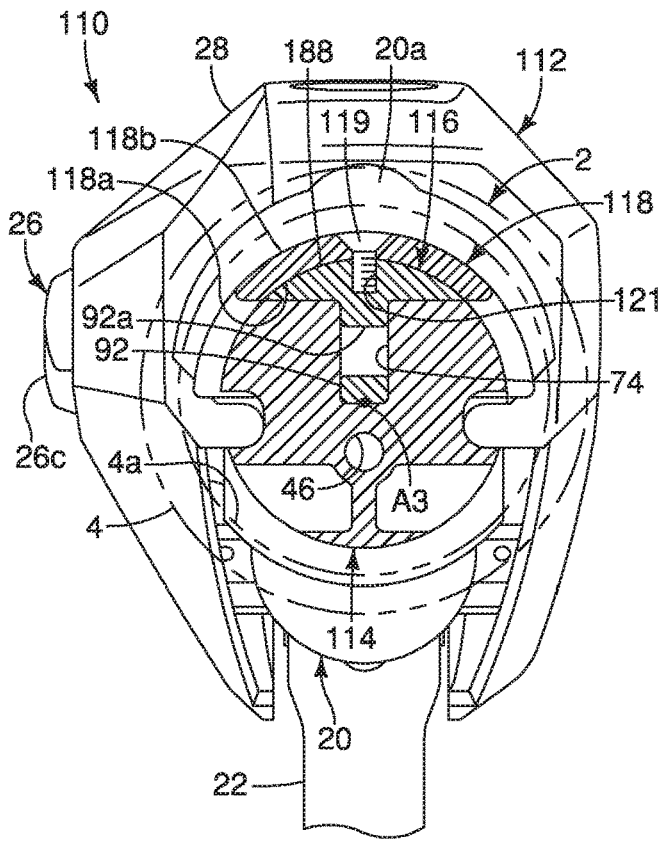
FIG. 22 is a transverse cross sectional view, similar to FIG. 14, of the bar-end device assembly illustrated in FIGS. 20 and 21 but with the base member inserted into the interior of the second bicycle handlebar, and the modified first shoe and the adapter in the retracted position.
Figure 23:
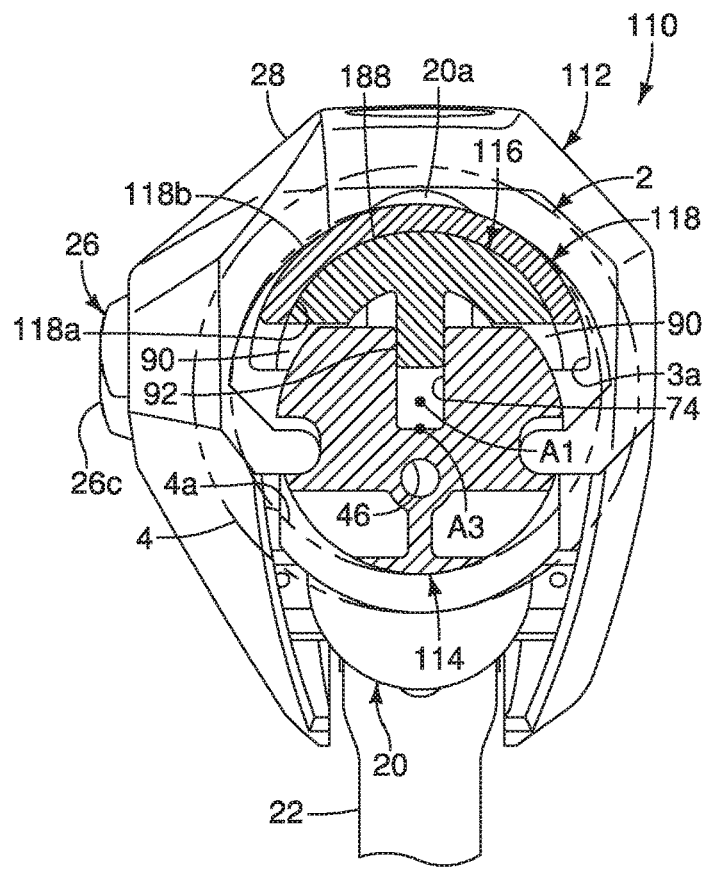
FIG. 23 is a transverse cross sectional view, similar to FIG. 15, of the bar-end device assembly illustrated in FIGS. 20 to 22 but with the base member inserted into the interior of the second bicycle handlebar, and the modified first shoe and the adapter in the extended position.
Figure 24:
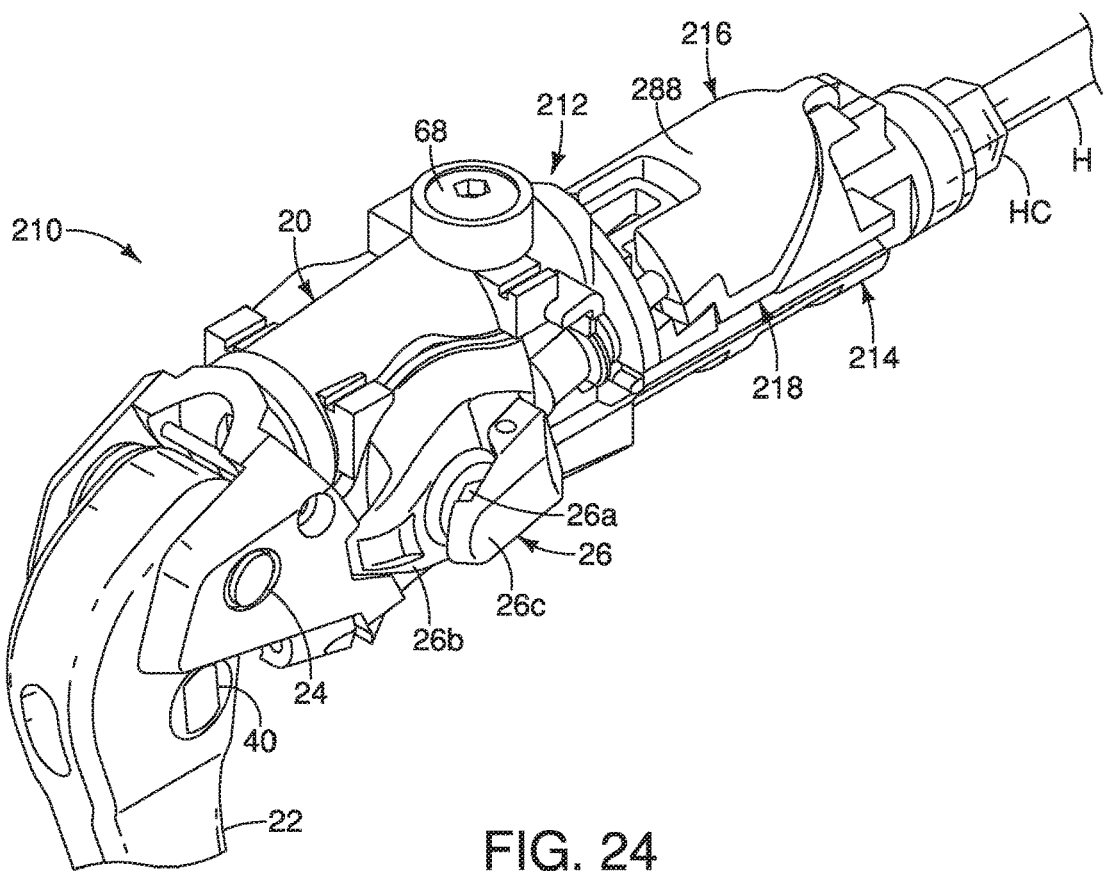
FIG. 24 is a perspective view of the bar-end device assembly illustrated in accordance with a third embodiment in which the base member includes the first shoe and an adapter shown in a retracted position.
Figure 25:
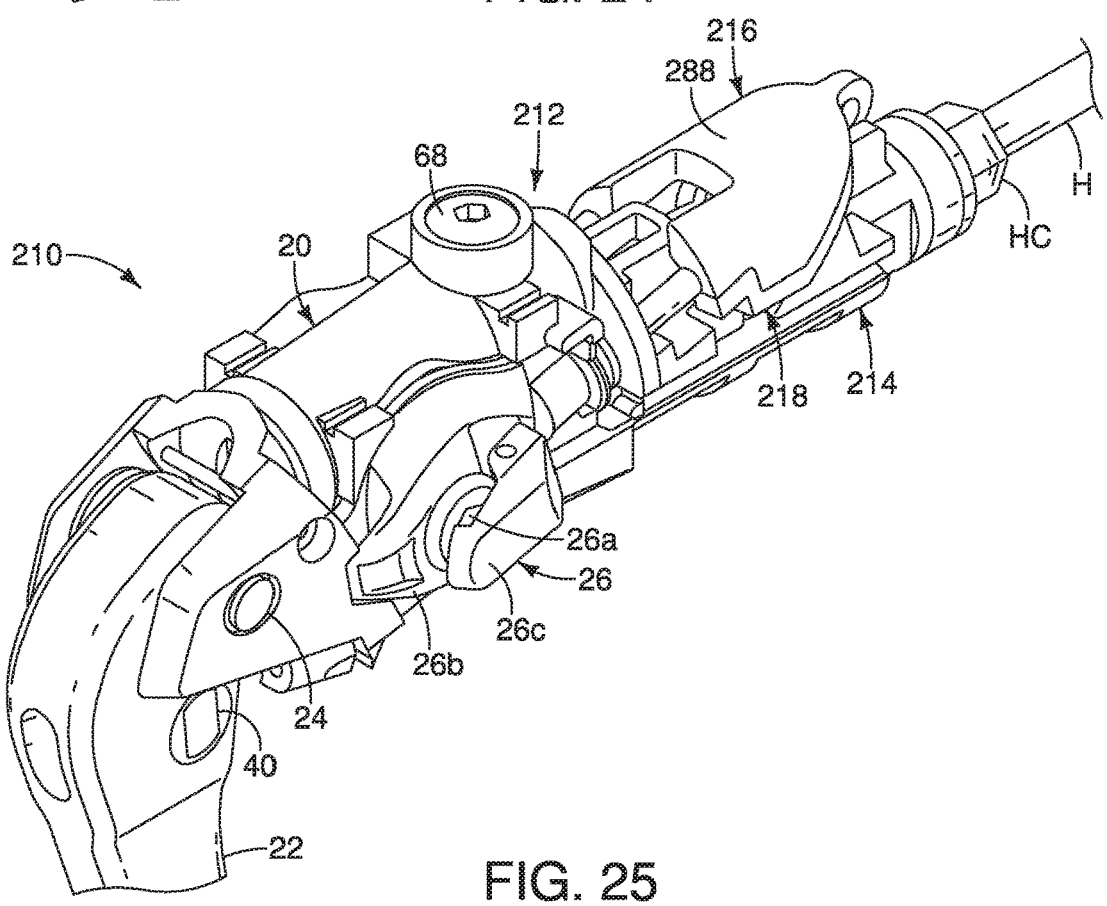
FIG. 25 is a perspective view of the bar-end device assembly illustrated in FIG. 24 but with the first shoe and the adapter shown in an extended position.

Accordingly, the shoe 116 is used without the adapter 118 for tube members such as the first bicycle handlebar 1 having a first predetermined interior dimension, while the shoe 116 and the adapter 118 are used together for tube members such as the second bicycle handlebar 2 having a second predetermined interior dimension that is larger than the first predetermined interior dimension. In this way, the bar-end device assembly 110 can be mounted to either the first bicycle handlebar 1 as shown in FIG. 22 or the second bicycle handlebar 2 as shown in FIG. 23.

Here, as the shoe 116 and the adapter 118 are used together, a fastener 119 is provided to fix the adapter 118 onto the shoe 116. However, the fastener 119 can be omitted as needed and/or desired. Here, the fastener 119 is a screw that is screwed into an internally threaded bore 121 of the shoe 116. The base member 112 is identical to the base member 12 having the first shoe 16, except that the shoe 116 differs from the first shoe 16 in that the shoe 116 has the internally threaded bore 121. For this reason, the base member 112 will not be discussed in detail herein.

Similar to the first embodiment, the bar-end device assembly 110 includes the operating member 22, the additional operating member 26 and the cover 28, which are attached to the base member 112 in the same manner they are attached to the base member 12 as discussed above. Likewise, similar to the first embodiment, the base member 112 of the bar-end device assembly 110 is connected to the hydraulic hose H using the hydraulic hose connector HC for operating a hydraulically operated bicycle component.

Referring now to FIGS. 24 to 27, a bar-end device assembly 210 in accordance with a third embodiment will now be discussed. Basically, similar to the first embodiment, the bar-end device assembly 210 is provided for a tube member (e.g., the first and second bicycle handlebars land 2) of a bicycle.

Here, the bar-end device assembly 210 comprises a base member 212 that includes a mounting portion 214, a shoe 216 and an adapter 218. The mounting portion 214 is configured to be mounted within an interior of a free end provided on the tube member. Basically, the bar-end device assembly 210 is identical to the bar-end device assembly 10, which is discussed above, except that the adapter 218 is used in place of the second shoe 18 and the shoe 216 is no longer attached to the mounting portion 214 with a mounting pin such as the mounting pin 70. In this third embodiment, the adapter 218 is configured to be selectively disposed between the shoe 216 and the base member 212 such that the shoe 216 contacts an interior surface of the tube member in a mounted state where the base member 212 is mounted to the tube member (e.g., the second bicycle handlebar 2). In other words, the adapter 218 can be attached to either a bottom or lower surface of the shoe 216 that faces the mounting portion 214 or a top or upper surface of the mounting portion 214. Accordingly, the adapter 218 has a profile that matches the bottom surface of the shoe 216 and the top surface of the mounting portion 214. Here, the shoe 216 has an outer surface 288 that is convexly curved for contacting a concave surface of an interior of a tube member. However, the outer surface of the shoe 216 can be changed to match a non-curved surface of a tube member as needed and/or desired.

The shoe 216 is movably mounted to the mounting portion 214 of the base member 212 to change an effective mounting dimension of the base member 212. The adapter 218 is configured to be selectively disposed between the bottom surface of the shoe 216 and the base member 212 such that the mounting portion 214 and the shoe 216 contact an interior surface of the tube member (e.g., the second bicycle handlebar 2) in a mounted state where the base member 212 is mounted to the tube member.

Figure 26:
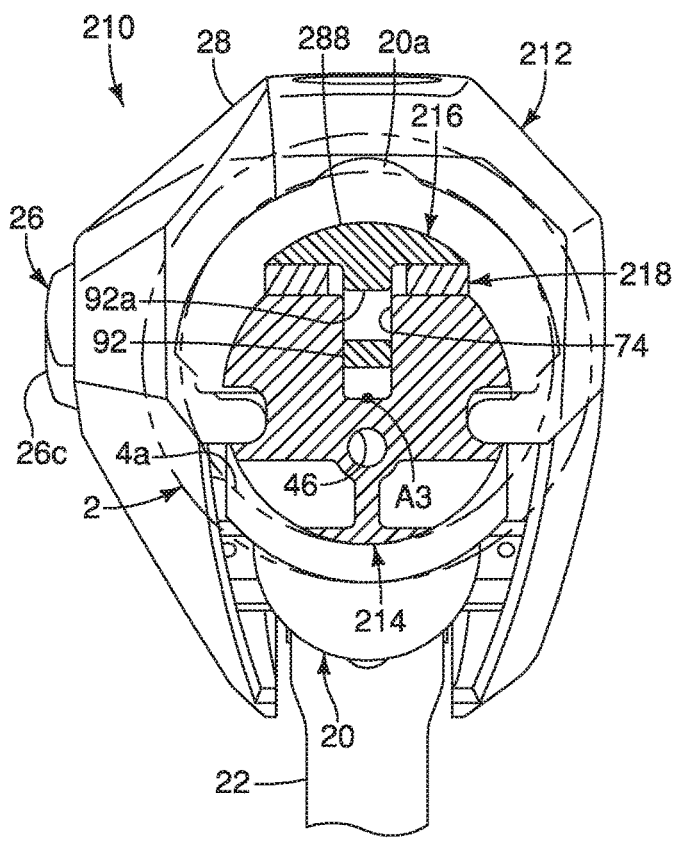
FIG. 26 is a transverse cross sectional view, similar to FIG. 14, of the bar-end device assembly illustrated in FIGS. 24 and 25 with the base member inserted into the interior of the second bicycle handlebar, and the first shoe and the adapter in the retracted position.
Figure 27:
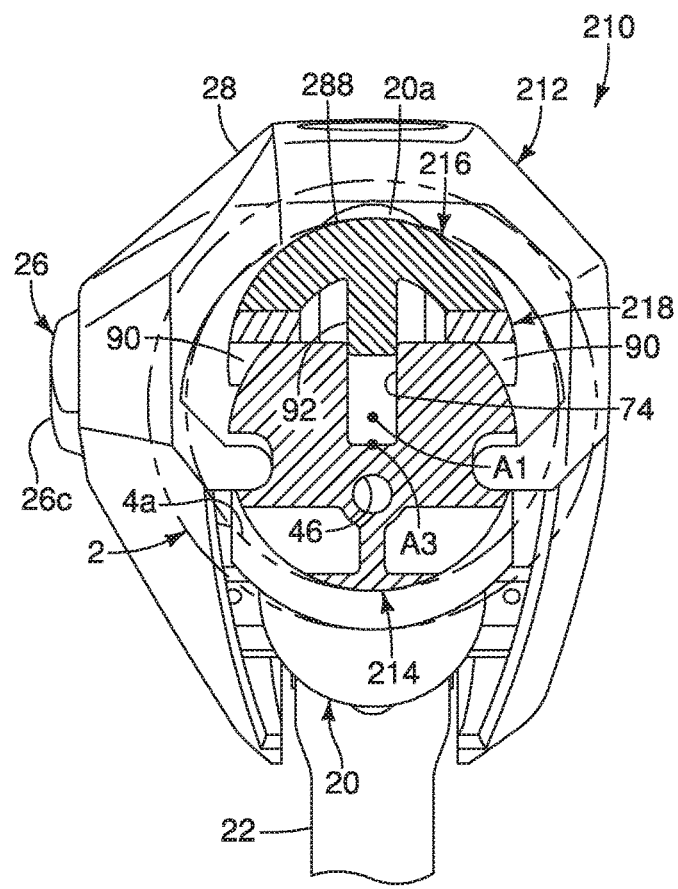
FIG. 27 is a transverse cross sectional view, similar to FIG. 15, of the bar-end device assembly illustrated in FIGS. 24 to 26 with the base member inserted into the interior of the second bicycle handlebar, and the first shoe and the adapter in the extended position.
Figure 28:
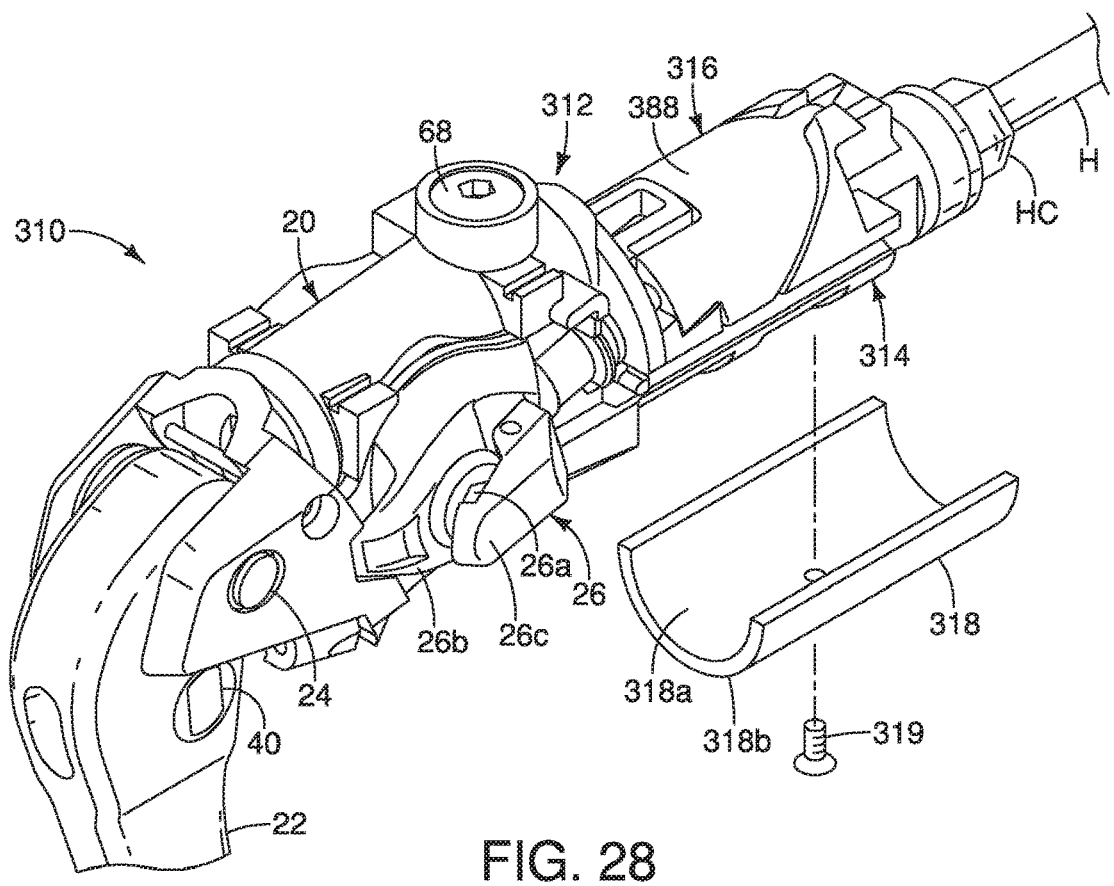
FIG. 28 is a partially exploded perspective view of the bar-end device assembly in accordance with a fourth embodiment in which the base member includes the first shoe and an adapter.
Figure 29:
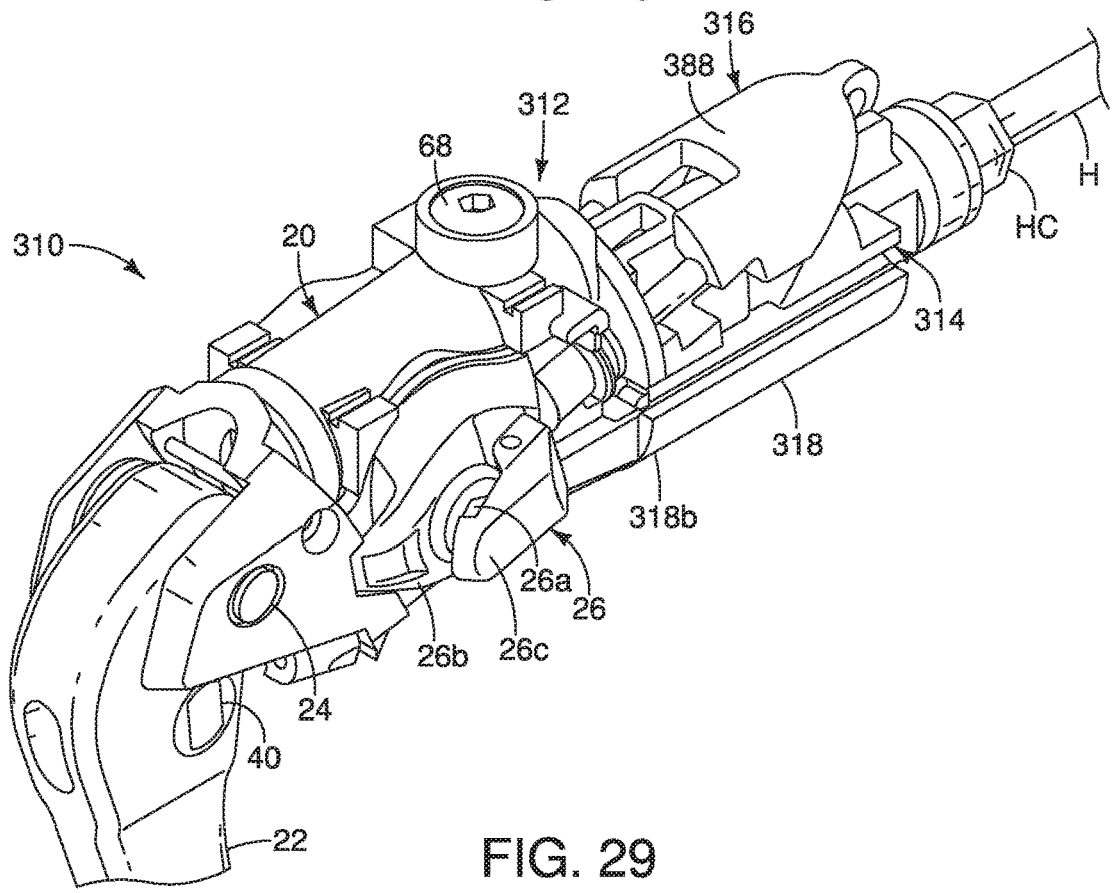
FIG. 29 is a perspective view of the bar-end device assembly illustrated in FIG. 28 with the adapter attached to the mounting portion of the base member, and the first shoe shown in the extended position.

Accordingly, the shoe 216 is used without the adapter 218 for tube members such as the first bicycle handlebar 1 having a first predetermined interior dimension, while the shoe 216 and the adapter 218 are used together for tube members such as the second bicycle handlebar 2 having a second predetermined interior dimension that is larger than the first predetermined interior dimension. In this way, the bar-end device assembly 210 can be mounted to either the first bicycle handlebar 1 as shown in FIG. 26 or the second bicycle handlebar 2 as shown in FIG. 27.

Similar to the first embodiment, the bar-end device assembly 210 includes the operating member 22, the additional operating member 26 and the cover 28, which are attached to the base member 212 in the same manner they are attached to the base member 12 as discussed above. Likewise, similar to the first embodiment, the base member 212 of the bar-end device assembly 210 is connected to the hydraulic hose H using the hydraulic hose connector HC for operating a hydraulically operated bicycle component.

Referring now to FIGS. 28 to 31, a bar-end device assembly 310 in accordance with a fourth embodiment will now be discussed. Basically, similar to the first embodiment, the bar-end device assembly 310 is provided for a tube member (e.g., the first and second bicycle handlebars land 2) of a bicycle.

Here, the bar-end device assembly 310 comprises a base member 312 that includes a mounting portion 314, a shoe 316 and an adapter 318. The mounting portion 314 is configured to be mounted within an interior of a free end provided on the tube member. Basically, the bar-end device assembly 310 is identical to the bar-end device assembly 10, which is discussed above, except that the adapter 318 is used in place of the second shoe 18. In this fourth embodiment, the adapter 318 is configured to be selectively disposed on an opposite side of the base member 312 with respect to the shoe 316 such that the adapter 318 and the shoe 316 contact an interior surface of the tube member in a mounted state where the base member 312 is mounted to the tube member (e.g., the second bicycle handlebar 2.

The shoe 316 is movably mounted to the mounting portion 314 of the base member 312 to change an effective mounting dimension of the base member 312. The adapter 318 is configured to be selectively disposed on an outer surface of the base member 312 such that the adapter 318 contacts an interior surface of the tube member (e.g., the second bicycle handlebar 2) in a mounted state where the base member 312 is mounted to the tube member. Here, the outer surface of the base member 312 is convexly curved, and the adapter 318 has a concave surface 318a and a convexly curved surface 318b. Accordingly, the concave surface 318a is configured to receive the outer surface of the base member 312, and the convexly curved surface 318b is configured to contact the interior surface of the tube member, Here, the shoe 316 has an outer surface 388 that is convexly curved for contacting a concave surface of an interior of a tube member. However, the shapes of the base member 312, the shoe 316 and the adapter 318 can be different depending on the shape of the interior surface of the tube member.

Figure 30:
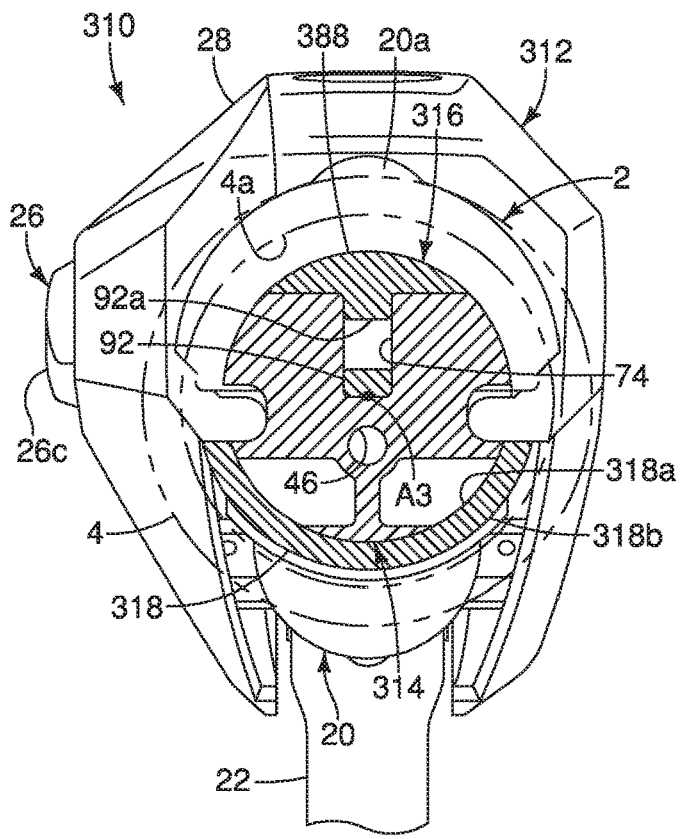
FIG. 30 is a transverse cross sectional view, similar to FIG. 14, of the bar-end device assembly illustrated in FIGS. 28 and 29 with the base member inserted into the interior of the handlebar with the shoe and the adapter in the retracted position.
Figure 31:
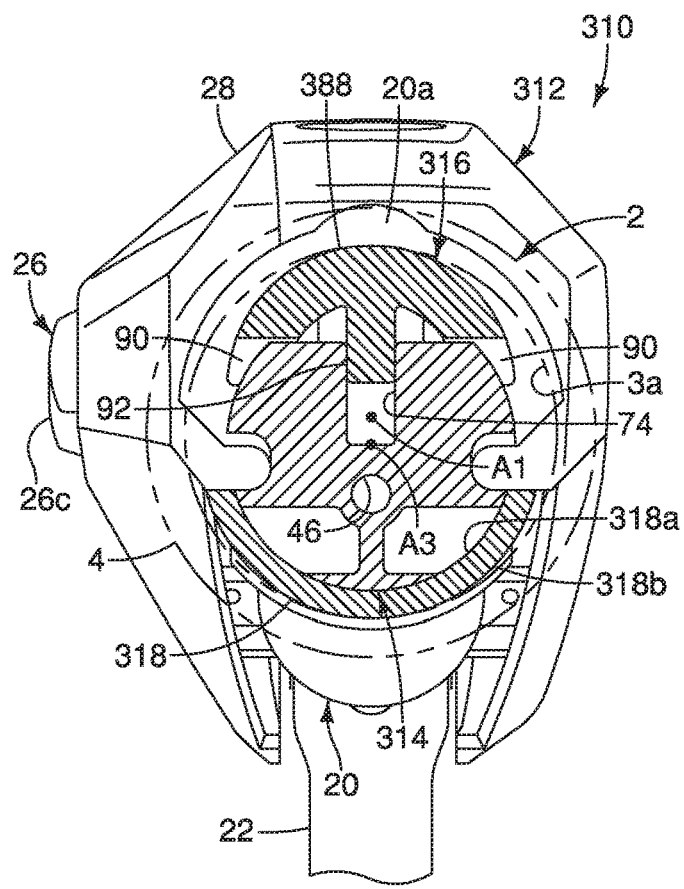
FIG. 31 is a transverse cross sectional view, similar to FIG. 15, of the bar-end device assembly illustrated in FIGS. 28 to 30 with the base member inserted into the interior of the handlebar and the shoe in the extended position.

Accordingly, the shoe 316 is used without the adapter 318 for tube members such as the first bicycle handlebar 1 having a first predetermined interior dimension, while the shoe 316 and the adapter 318 are used together for tube members such as the second bicycle handlebar 2 having a second predetermined interior dimension that is larger than the first predetermined interior dimension. In this way, the bar-end device assembly 310 can be mounted to either the first bicycle handlebar 1 as shown in FIG. 30 or the second bicycle handlebar 2 as shown in FIG. 31.

Here, as the adapter 318 is used, a fastener 319 is provided to fix the adapter 318 onto the base member 312. However, the fastener 319 can be omitted as needed and/or desired. Here, the fastener 319 is a screw that is screwed into an internally threaded bore 321 of the base member 312. The base member 312 is identical to the base member 12 having the first shoe 16, except for the addition of the internally threaded bore 321. For this reason, the base member 312 will not be discussed in detail herein.

Similar to the first embodiment, the bar-end device assembly 310 includes the operating member 22, the additional operating member 26 and the cover 28, which are attached to the base member 312 in the same manner they are attached to the base member 12 as discussed above. Likewise, similar to the first embodiment, the base member 312 of the bar-end device assembly 310 is connected to the hydraulic hose H using the hydraulic hose connector HC for operating a hydraulically operated bicycle component.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bar-end device assembly. Accordingly, these directional terms, as utilized to describe the bar-end device assembly should be interpreted relative to a bicycle in an upright riding position on a horizontal surface and that is equipped with the bar-end device assembly. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bar-end device assembly for a tube member of a bicycle comprising:
    a base member including
        a mounting portion configured to be mounted within an interior of a free end provided on the tube member;
        a first shoe configured to engage the interior of the tube member in a first mounted state where the mounting portion is mounted to the free end of the tube member with the first mounting shoe disposed on the mounting portion;
        a second shoe configured to engage the interior of the tube member in a second mounted state where the mounting portion is mounted to the free end of the tube member with the second mounting shoe disposed on the mounting portion; and
        a pin configured to connect each of the first and second shoes to the mounting portion, each of the first and second shoes being configured to be movable with respect to the pin in a mounted state, the pin extending perpendicularly to a movement direction of each of the first and second shoes in the mounted state, the movement direction being a direction in which the first and second shoes move relative to the pin,
    the first and second shoes having different configurations and being alternately disposed and movably mounted to the mounting portion to change an effective mounting dimension of the base member.

2. The bar-end device assembly according to claim 1, further comprising
    a hydraulic unit provided on the base member and including a hydraulic cylinder.

3. The bar-end device assembly according to claim 2, wherein
    the hydraulic cylinder is at least partially disposed inside the tube member in the first and second mounted states.

4. The bar-end device assembly according to claim 2, wherein
    the mounting portion of the base member includes a hydraulic hose connection.

5. The bar-end device assembly according to claim 4, wherein
    the mounting portion of the base member includes a fluid passage fluidly connecting a cylinder bore of the hydraulic cylinder to the hydraulic hose connection.

6. The bar-end device assembly according to claim 2, further comprising
    an operating member configured to operate the hydraulic unit, and
    the hydraulic unit further including a piston movably disposed in a cylinder bore of the hydraulic cylinder in response to a movement of the operating member.

7. The bar-end device assembly according to claim 6, further comprising an additional operating member provided on one of the base member and the operating member.

8. The bar-end device assembly according to claim 6, wherein
the additional operating member includes an electrical switch.

9. The bar-end device assembly according to claim 1, wherein
the base member further includes an abutment that is configured to contact the free end of the tube member.

10. The bar-end device assembly according to claim 1, further comprising
an actuator operatively coupled to one of the first and second shoes that is movably mounted to the mounting portion.

11. The bar-end device assembly according to claim 10, wherein
the first and second shoes are alternately disposed and slidably mounted to the mounting portion, and
the actuator is arranged to move the one of the first and second shoes that is mounted to the mounting portion between a retracted position and an extended position upon operation of the actuator.

12. The bar-end device assembly according to claim 10, wherein
the actuator is accessible from outside of the tube member in the first and second mounted states.

13. The bar-end device assembly according to claim 10, wherein
the mounting portion has an axial length in a range of twenty millimeters to sixty millimeters.

14. A bar-end device assembly for a tube member of a bicycle comprising:

a base member including
a mounting portion configured to be mounted within an interior of a free end, provided on the tube member;
a first shoe configured to engage the interior of the tube member in a first mounted state where the mounting portion is mounted to the free end of the tube member with the first mounting shoe disposed on the mounting portion;
a second shoe configured to engage the interior of the tube member in a second mounted state where the mounting portion is mounted to the free, end of the tube member with the second mounting shoe disposed on the mounting portion;
a pin configured to connect each of the first and second shoes to the mounting portion, each of the first and second shoes being configured to be movable with respect to the pin in a mounted state, the pin extending perpendicularly to a movement direction of each of the first and second shoes in the mounted state; and
a hydraulic unit provided on the base member and including a hydraulic cylinder,
the first and second shoes having different configurations and being alternately disposed and movably mounted to the mounting portion to change an effective mounting dimension of the base member, and
the hydraulic unit including a reservoir being in fluid communication with the hydraulic cylinder.

15. The bar-end device assembly according to claim 14, wherein
the reservoir is at least partially disposed outside the tube member in the first and second mounted states.

* * * * *